US012614295B2

(12) United States Patent
Shi et al.

(10) Patent No.: US 12,614,295 B2
(45) Date of Patent: Apr. 28, 2026

(54) DEPTH COMPLETION USING ATTENTION-BASED REFINEMENT OF FEATURES

(71) Applicant: QUALCOMM Incorporated, San Diego, CA (US)

(72) Inventors: Yunxiao Shi, San Diego, CA (US); Hong Cai, San Diego, CA (US); Manish Kumar Singh, San Diego, CA (US); Shizhong Steve Han, San Diego, CA (US); Yinhao Zhu, La Jolla, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 259 days.

(21) Appl. No.: 18/633,302

(22) Filed: Apr. 11, 2024

(65) Prior Publication Data

US 2025/0148628 A1      May 8, 2025

Related U.S. Application Data

(60) Provisional application No. 63/596,166, filed on Nov. 3, 2023.

(51) Int. Cl.
*G06K 9/00*          (2022.01)
*G06T 3/40*          (2006.01)
(Continued)

(52) U.S. Cl.
CPC ................. *G06T 7/50* (2017.01); *G06T 3/40* (2013.01); *G06V 10/44* (2022.01)

(58) Field of Classification Search
CPC . G06T 2207/10028; G06T 2207/20081; G06T 2207/20084; G06T 3/40; G06T 7/50; G06T 7/55; G06V 10/44; G06V 10/82
See application file for complete search history.

(56) References Cited

U.S. PATENT DOCUMENTS

2020/0273192 A1 * 8/2020 Cheng ................... G06V 10/454
2021/0103763 A1 * 4/2021 Fan ....................... G06N 3/0464
(Continued)

OTHER PUBLICATIONS

Yu, Zhu, et al. "Aggregating feature point cloud for depth completion." Proceedings of the IEEE/CVF international conference on computer vision. 2023. (Year: 2023).*
(Continued)

*Primary Examiner* — Hadi Akhavannik
(74) *Attorney, Agent, or Firm* — QUALCOMM Incorporated; Espartaco Diaz Hidalgo

(57) ABSTRACT

Systems and techniques are provided for generating depth information from one or more images. For example, a process can include obtaining a first depth map corresponding to an input comprising an image of the one or more images and a sparse depth measurement. A three-dimensional (3D) point cloud can be generated based on the first depth map and multi-scale visual features of the input, wherein the 3D point cloud includes a plurality of 3D point features uplifted from the multi-scale visual features. At least a portion of the plurality of 3D point features can be processed using one or more self-attention layers to generate refined 3D point features. A two-dimensional (2D) projection of the refined 3D point features can be generated and a second depth map can be generated based on the 2D projection of the refined 3D point features.

20 Claims, 12 Drawing Sheets

(51) Int. Cl.
   *G06T 7/50*      (2017.01)
   *G06V 10/44*     (2022.01)

(56)             References Cited

U.S. PATENT DOCUMENTS

2021/0174524 A1*   6/2021   Wang ........................ G06N 3/08
2021/0279943 A1*   9/2021   Murez ................. G06N 3/0464
2022/0148203 A1*   5/2022   Guizilini ................. G01S 17/86

OTHER PUBLICATIONS

Chen, Yun, et al. "Learning joint 2d-3d representations for depth completion." Proceedings of the IEEE/CVF International Conference on Computer Vision. 2019. (Year: 2019).*
Liu X., et al., "GraphCSPN: Geometry-Aware Depth Completion via Dynamic GCNs", Arxiv.org, Computer Science, Computer Vision and Pattern Recognition, arXiv:2210.10758v1 [cs.CV], Oct. 19, 2022, 17 Pages.

\* cited by examiner

202

Fully Connected

204

Locally Connected

206

Convolutional

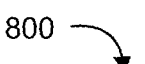

800

Obtain a first depth map corresponding to an input comprising an image of the one or more images and a sparse depth measurement
802

Generate a three-dimensional (3D) point cloud based on the first depth map and multi-scale visual features of the input, wherein the 3D point cloud includes a plurality of 3D point features uplifted from the multi-scale visual features
804

Process at least a portion of the plurality of 3D point features using one or more self-attention layers to generate refined 3D point features
806

Generate a two-dimensional (2D) projection of the refined 3D point features
808

Generate a second depth map based on the 2D projection of the refined 3D point features
810

FIG. 8

DEPTH COMPLETION USING ATTENTION-BASED REFINEMENT OF FEATURES

CROSS-REFERENCE TO RELATED APPLICATIONS

This application claims the benefit of U.S. Provisional Patent Application No. 63/596,166, filed Nov. 3, 2023, which is hereby incorporated by reference, in its entirety and for all purposes.

FIELD OF THE DISCLOSURE

The present disclosure generally relates to depth estimation from one or more images. For example, aspects of the present disclosure relate to systems and techniques for attention-based refinement for depth completion.

BACKGROUND

Many devices and systems allow a scene to be captured by generating images (or frames) and/or video data (including multiple frames) of the scene. For example, a camera or a device including a camera can capture a sequence of frames of a scene (e.g., a video of a scene). In some cases, the sequence of frames can be processed for performing one or more functions, can be output for display, can be output for processing and/or consumption by other devices, among other uses.

An artificial neural network attempts to replicate, using computer technology, logical reasoning performed by the biological neural networks that constitute animal brains. Deep neural networks, such as convolutional neural networks, are widely used for numerous applications, such as object detection, object classification, object tracking, big data analysis, among others. For example, convolutional neural networks are able to extract high-level features, such as facial shapes, from an input image, and use these high-level features to output a probability that, for example, an input image includes a particular object.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing depth completion. According to at least one illustrative example, a method of wireless communications is provided, the method comprising: obtaining a first depth map corresponding to an input comprising an image of the one or more images and a sparse depth measurement; generating a three-dimensional (3D) point cloud based on the first depth map and multi-scale visual features of the input, wherein the 3D point cloud includes a plurality of 3D point features uplifted from the multi-scale visual features; processing at least a portion of the plurality of 3D point features using one or more self-attention layers to generate refined 3D point features; generating a two-dimensional (2D) projection of the refined 3D point features; and generating a second depth map based on the 2D projection of the refined 3D point features.

In another example, an apparatus is provided. The apparatus includes at least one memory and at least one processor coupled to the at least one memory and configured to: obtain a first depth map corresponding to an input comprising an image of the one or more images and a sparse depth measurement; generate a three-dimensional (3D) point cloud based on the first depth map and multi-scale visual features of the input, wherein the 3D point cloud includes a plurality of 3D point features uplifted from the multi-scale visual features; process at least a portion of the plurality of 3D point features using one or more self-attention layers to generate refined 3D point features; generate a two-dimensional (2D) projection of the refined 3D point features; and generate a second depth map based on the 2D projection of the refined 3D point features.

In another example, a non-transitory computer-readable medium is provided that includes instructions that, when executed by at least one processor, cause the at least one processor to: obtain a first depth map corresponding to an input comprising an image of the one or more images and a sparse depth measurement; generate a three-dimensional (3D) point cloud based on the first depth map and multi-scale visual features of the input, wherein the 3D point cloud includes a plurality of 3D point features uplifted from the multi-scale visual features; process at least a portion of the plurality of 3D point features using one or more self-attention layers to generate refined 3D point features; generate a two-dimensional (2D) projection of the refined 3D point features; and generate a second depth map based on the 2D projection of the refined 3D point features.

In another example, an apparatus is provided. The apparatus includes: means for obtaining a first depth map corresponding to an input comprising an image of the one or more images and a sparse depth measurement; means for generating a three-dimensional (3D) point cloud based on the first depth map and multi-scale visual features of the input, wherein the 3D point cloud includes a plurality of 3D point features uplifted from the multi-scale visual features; means for processing at least a portion of the plurality of 3D point features using one or more self-attention layers to generate refined 3D point features; means for generating a two-dimensional (2D) projection of the refined 3D point features; and means for generating a second depth map based on the 2D projection of the refined 3D point features.

Aspects generally include a method, apparatus, system, computer program product, non-transitory computer-readable medium, user device, user equipment, wireless communication device, and/or processing system as substantially described with reference to and as illustrated by the drawings and specification.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a flowchart illustrating an example process for generating depth information from one or more images, in accordance with some examples;

DETAILED DESCRIPTION

Figure 1:
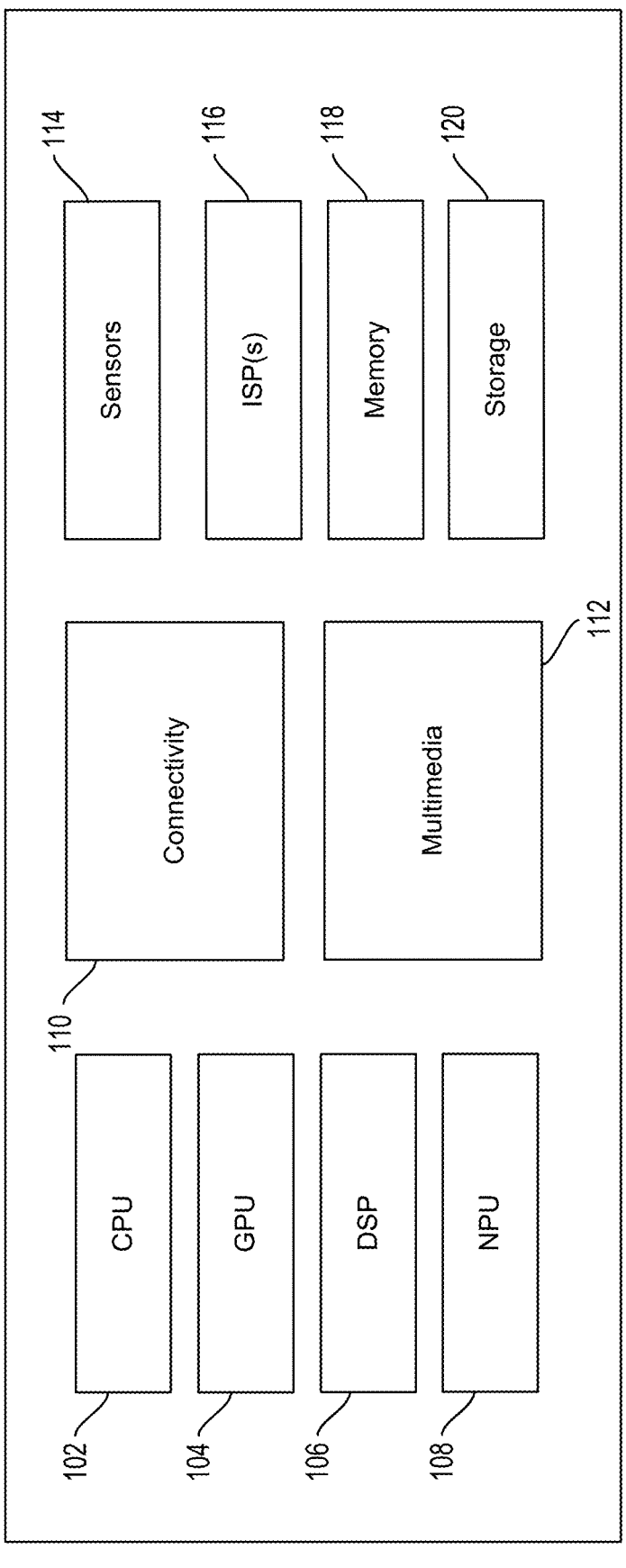
FIG. 1 illustrates an example implementation of a system-on-a-chip (SoC), in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

As noted above, machine learning systems (e.g., deep neural network systems or models) can be used to perform a variety of tasks such as, for example and without limitation, detection and/or recognition (e.g., scene or object detection and/or recognition, face detection and/or recognition, etc.), depth estimation, pose estimation, image reconstruction, classification, three-dimensional (3D) modeling, dense regression tasks, data compression and/or decompression, and image processing, among other tasks. Moreover, machine learning models can be versatile and can achieve high quality results in a variety of tasks.

In some cases, a machine learning system can perform depth prediction based on a single image (e.g., based on receiving a single image as input). Depth prediction based on a single input image can be referred to as monocular depth estimation. Monocular depth estimation can be used for many applications (e.g., XR applications, vehicle applications, etc.). In some cases, monocular depth estimation can be used to perform occlusion rendering, for example based on using depth and object segmentation information to render virtual objects in a 3D environment. In some cases, monocular depth prediction can be used to perform 3D reconstruction, for example based on using depth information and one or more poses to create a mesh of a scene. In some cases, monocular depth prediction can be used to perform collision avoidance, for example based on using depth information to estimate distance(s) to one or more objects.

Depth estimation (e.g., such as monocular depth estimation) can be used to generate three-dimensional content (e.g., such as XR content) with greater accuracy. For instance, monocular depth estimation can be used to generate XR content that combines a baseline image or video with one or more augmented overlays of rendered 3D objects. The baseline image data (e.g., an image or a frame of video) that is augmented or overlaid by an XR system may be a two-dimensional (2D) representation of a 3D scene. A naïve approach to generating XR content may be to overlay a rendered object onto the baseline image data, without compensating for 3D depth information that may be represented in the 2D baseline image data.

Depth information can be obtained from one or more depth sensors which can include, but are not limited to, Time of Flight (ToF) sensors and Light Detection and Ranging (LIDAR) sensors. Depth information can additionally, or alternatively, be obtained as a prediction or estimation that is generated based on an image input, a depth input, etc. Accurate depth information can be used for autonomous and/or self-driving vehicles to perceive a driving scene and surrounding environment, and to estimate the distances between the autonomous vehicle and surrounding environmental objects (e.g., other vehicles, pedestrians, roadway elements, etc.). Accurate depth information is needed for the autonomous vehicle to determine and perform appropriate control actions, such as velocity control, steering control, braking control, etc.

Depth information can be used for extended reality (XR) applications for functions such as indoor scene reconstruction and obstacle detection for users, among various others. Accurate depth information can be needed for improved integration of real scenes with virtual scenes and/or to allow users to smoothly and safely interact with both their real-world surroundings and the XR or VR environment. Depth information can be used in robotics to perform functions such as navigation, localization, and interaction with physical objects in the robot's surrounding environment, among various other functions. Accurate depth information can be needed to provide improved navigation, localization, and interaction between robots and their surrounding environment (e.g., to avoid colliding with obstacles, nearby humans, etc.).

Depth information of a scene or image can be referred to as "sparse" when depth information is available for some, but not all, of the points in the scene or the pixels in the image. Depth information of a scene or image can be referred to as "dense" when depth information is available for all of the points in the scene or the pixels in the image. In some examples, sparse depth information can be obtained (e.g., using a lidar sensor or other ToF sensor) for a subset of pixels in an image captured by a camera associated with the lidar or ToF sensor. For instance, the field of view captured by the depth sensor can be smaller than the field of view captured by the camera. Sparse depth information can include the depth information determined for the subset of pixels in the overlapping field of view between the depth sensor and the camera.

Depth completion is a sub-problem of depth estimation, and is the task of predicting, estimating, or otherwise inferring a dense depth map of a three-dimensional scene given a sparse depth map of the scene as input. In some cases, depth completion can be performed to predict dense pixel-wise depth information from a sparse depth map captured using a depth sensor such as a lidar or other ToF sensor. For instance, depth completion can be performed based on a sparse-to-dense determination, in which the sparse depth map data of the scene is used to estimate or predict depth information for pixels that lack depth information in the sparse depth map data input. In some examples, depth completion can be performed to infer the dense depth map of a three-dimensional scene given an input image (e.g., RGB image, grayscale image, etc.) and a corresponding sparse reconstruction of the input image (e.g., in the form of a sparse depth map, obtained from computational techniques or active sensors such as lidar, structured light sensors, ToF sensors, etc.).

In some examples, existing approaches to performing depth completion can be based on iterative processing and/or iterative refinement of sparse depth features in order to achieve high-quality depth completion (e.g., to generate high-quality completed depth maps, also referred to as dense depth maps). In some examples, iterative processing and/or iterative refinement can be performed for dense depth features or dense depth maps. For example, one or more neural networks can perform processing to generate dense depth features from an input of sparse depth features, and the generated dense depth features can then be provided to the iterative processing and/or iterative refinement. The iterative processing and/or iterative refinement of sparse depth features and/or other depth information (e.g., such as dense depth features, etc.) utilizes deformable convolutions or dynamic graph propagation techniques, both of which are computationally complex. The computational complexity of deformable convolutions and dynamic graph propagation techniques makes it challenging to implement iterative processing-based depth completion techniques on computationally constrained and/or power-constrained devices (e.g., also referred to as "resource-constrained" devices), such as smartphones, tablets, and/or various other mobile computing devices, etc. There is a need for systems and techniques that can be used to perform depth completion without using iterative refinement techniques. There is a further need for systems and techniques that can be used to perform depth completion on resource-constrained devices.

Systems, apparatuses, processes (also referred to as methods), and computer-readable media (collectively referred to as "systems and techniques") are described herein for performing depth completion using self-attention based refinement of three-dimensional (3D) features. For instance, the systems and techniques can perform depth completion based on using self-attention to refine 3D sparse depth features (e.g., a 3D point cloud of sparse depth information). The self-attention-based refinement of 3D depth information can also be referred to as "3D self-attention."

For instance, the systems and techniques described herein can be used for improving depth completion via geometry-aware refinement. As noted previously, depth completion is an important task for various application, such as autonomous driving, AR and/or VR, and robotics, etc., among various others. Existing techniques may heavily rely on spatial propagation models (e.g., Non-Local Spatial Propagation Network (NLSPN), etc.) to achieve state-of-the-art performance. However, such spatial propagation models do not properly leverage three-dimensional (3D) information and require computationally expensive iterative processing. Aspects of the present disclosure leverage 3D information to improve the quality of monocular depth completion. The systems and techniques described herein do not require deformable convolutions. The improved (e.g., better) performance of the systems and techniques described herein is demonstrated on standard benchmarks.

In some aspects, the systems and techniques described herein for depth completion using 3D self-attention can be implemented without using iterative processing, dynamic graph propagation, or deformable convolutions. Various machine learning networks can be utilized as a baseline model or backbone architecture for generating an initial depth completion estimation and corresponding two-dimensional (2D) depth features. For instance, the initial depth completion estimation can be generated using 2D self-attention to refine 2D sparse depth features generating by an encoder from an input image and a sparse depth map (e.g., a ToF-based sparse depth map, a lidar-based sparse depth map, etc.). The initial depth completion estimation can include or correspond to a plurality of 2D features (e.g., the encoder 2D depth features with the 2D self-attention imposed thereupon).

From the initial depth completion estimation (e.g., an initial completed depth map, also referred to as an initial dense depth map or initial dense depth map estimation or estimate), the systems and techniques can uplift the corresponding 2D features into 3D features, using the depth information from the initial depth completion estimation. For instance, the systems and techniques can generate a 3D point cloud with point-wise features corresponding to the initial depth completion estimation.

The 3D point cloud with point-wise features can be provided to one or more 3D self-attention layers (e.g., transformer-based machine learning layers) configured to perform attention-based refinement. The 3D self-attention layers can generate a corresponding plurality of refined 3D depth features corresponding to the uplifted set of 3D depth features (e.g., the input 3D depth features to the 3D self-attention layers). The refined 3D depth features can be projected back to the 2D image plane and provided to a final decoder to generate a final completed depth map based on the 3D self-attention refinement of the depth features.

Further aspects of the systems and techniques will be described with reference to the figures.

FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104.

The SOC 100 may also include a sensor processor 114, image signal processors (ISPs) 116, and/or storage 120.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected.

SOC 100 and/or components thereof may be configured to perform image processing using machine learning techniques according to aspects of the present disclosure discussed herein. For example, SOC 100 and/or components thereof may be configured to perform depth completion according to aspects of the present disclosure. In some cases, by using a graph-based neural network with a segmentation input and a depth input each associated with a same image, aspects of the present disclosure can increase the accuracy and efficiency of generating dense depth maps from an image input and a sparse depth input.

SOC 100 can be part of a computing device or multiple computing devices. In some examples, SOC 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, an XR device (e.g., a head-mounted display, etc.), a smart wearable device (e.g., a smart watch, smart glasses, etc.), a laptop or notebook computer, a tablet computer, a set-top box, a television, a display device, a system-on-chip (SoC), a digital media player, a gaming console, a video streaming device, a server, a drone, a computer in a car, an Internet-of-Things (IoT) device, or any other suitable electronic device(s).

In some implementations, the CPU 102, the GPU 104, the DSP 106, the NPU 108, the connectivity block 110, the multimedia processor 112, the one or more sensors 114, the ISPs 116, the memory block 118 and/or the storage 120 can be part of the same computing device. For example, in some cases, the CPU 102, the GPU 104, the DSP 106, the NPU 108, the connectivity block 110, the multimedia processor 112, the one or more sensors 114, the ISPs 116, the memory block 118 and/or the storage 120 can be integrated into a smartphone, laptop, tablet computer, smart wearable device, video gaming system, server, and/or any other computing device. In other implementations, the CPU 102, the GPU 104, the DSP 106, the NPU 108, the connectivity block 110, the multimedia processor 112, the one or more sensors 114, the ISPs 116, the memory block 118 and/or the storage 120 can be part of two or more separate computing devices.

Machine learning (ML) can be considered a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP)

cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multilayer perceptron (MLP) neural networks, transformer neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

Deep learning (DL) is one example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer.

Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases. Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
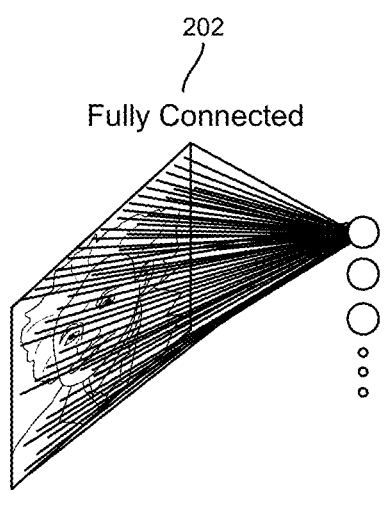
FIG. 2A illustrates an example of a fully connected neural network, in accordance with some examples.
Figure 2B:
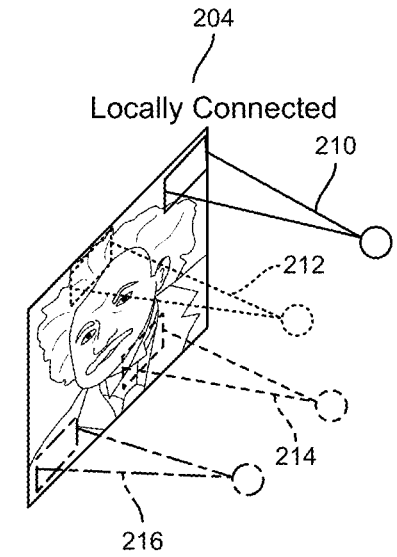
FIG. 2B illustrates an example of a locally connected neural network, in accordance with some examples.

The connections between layers of a neural network may be fully connected or locally connected. FIG. 2A illustrates an example of a fully connected neural network 202. In a fully connected neural network 202, a neuron in a first hidden layer may communicate its output to every neuron in a second hidden layer, so that each neuron in the second layer will receive input from every neuron in the first layer. FIG. 2B illustrates an example of a locally connected neural network 204. In a locally connected neural network 204, a neuron in a first hidden layer may be connected to a limited number of neurons in a second hidden layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
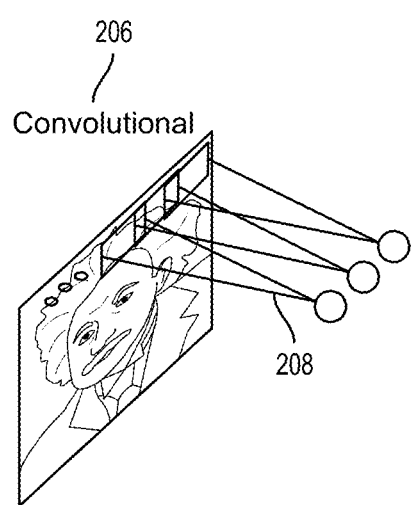
FIG. 2C illustrates an example of a convolutional neural network, in accordance with some examples.

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful. Convolutional neural network 206 may be used to perform one or more aspects of video compression and/or decompression, according to aspects of the present disclosure. An illustrative example of a deep learning network is described in greater depth with respect to the example block diagram of FIG. 9. An illustrative example of a convolutional neural network is described in greater depth with respect to the example block diagram of FIG. 10.

As noted previously, the systems and techniques described herein can be used to perform depth completion using 3D self-attention-based feature refinement of initial depth completion information (e.g., an initial depth completion estimation, also referred to as an "initial completed depth map" and/or an "estimated completed depth map"). The initial completed depth map can be generated using various machine learning architectures, backbones, and/or techniques for 2D depth completion. For instance, the initial completed depth map can be generated based on an image input captured by a single camera and corresponding sparse depth measurements for the image.

Figure 3:
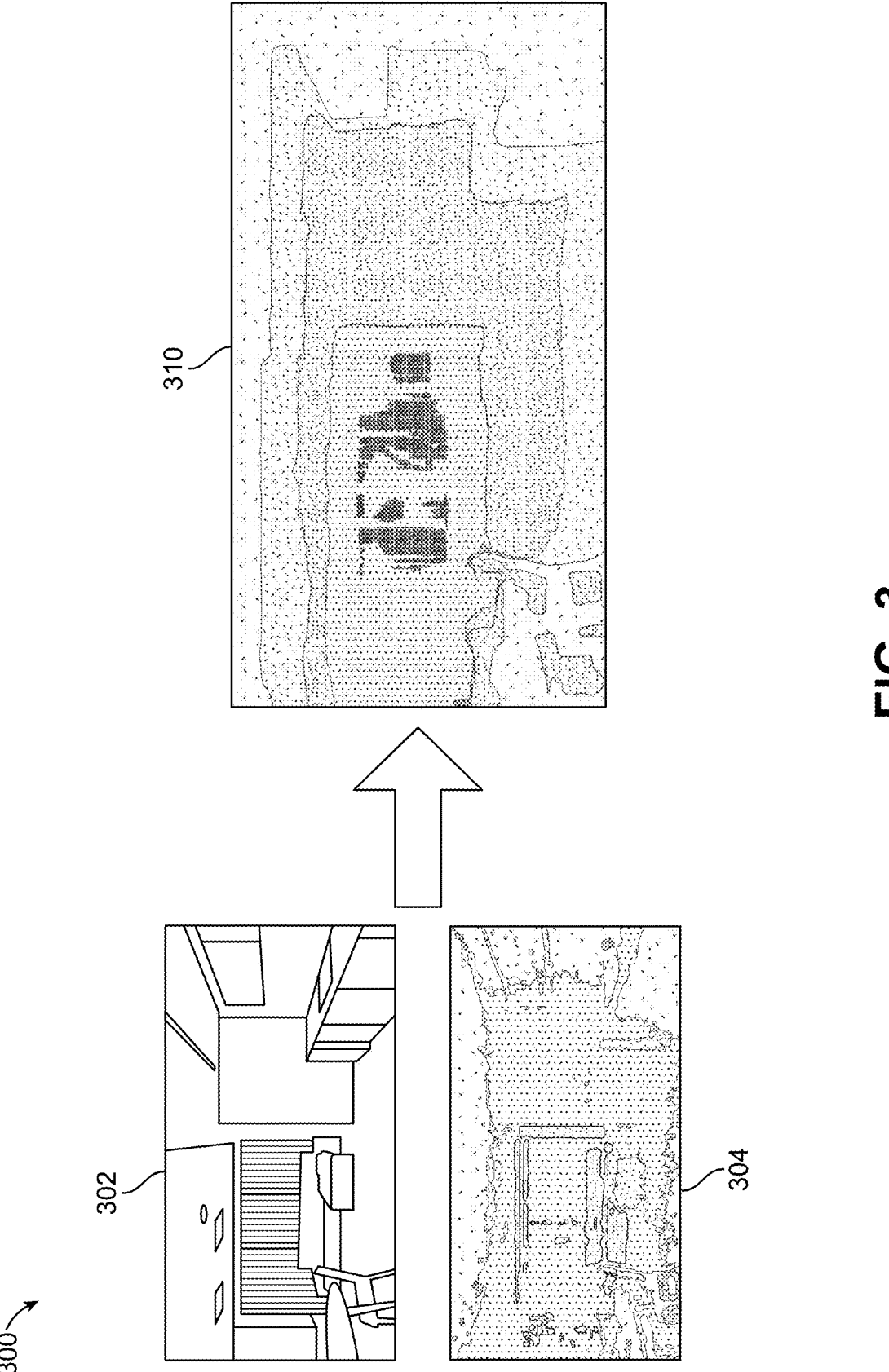
FIG. 3 illustrates an example of a completed depth map based on a single camera image and time-of-flight (ToF)-based sparse depth information, in accordance with some examples.

FIG. 3 is a diagram illustrating an example of depth completion 300, where an estimated completed depth map 310 is generated based on a single camera image 302 and time-of-flight (ToF)-based sparse depth information 304. In some examples, the ToF-based sparse depth information 304 can also be referred to as a ToF-based sparse depth map 304. In some cases, the completed depth map 310 can be generated based on estimating the distance of each pixel from the camera used to capture the single image 302. In some cases, the estimated completed depth map 310 can be used as the initial completed depth map utilized by the systems and techniques described herein to perform 3D self-attention based depth refinement.

Figure 4:
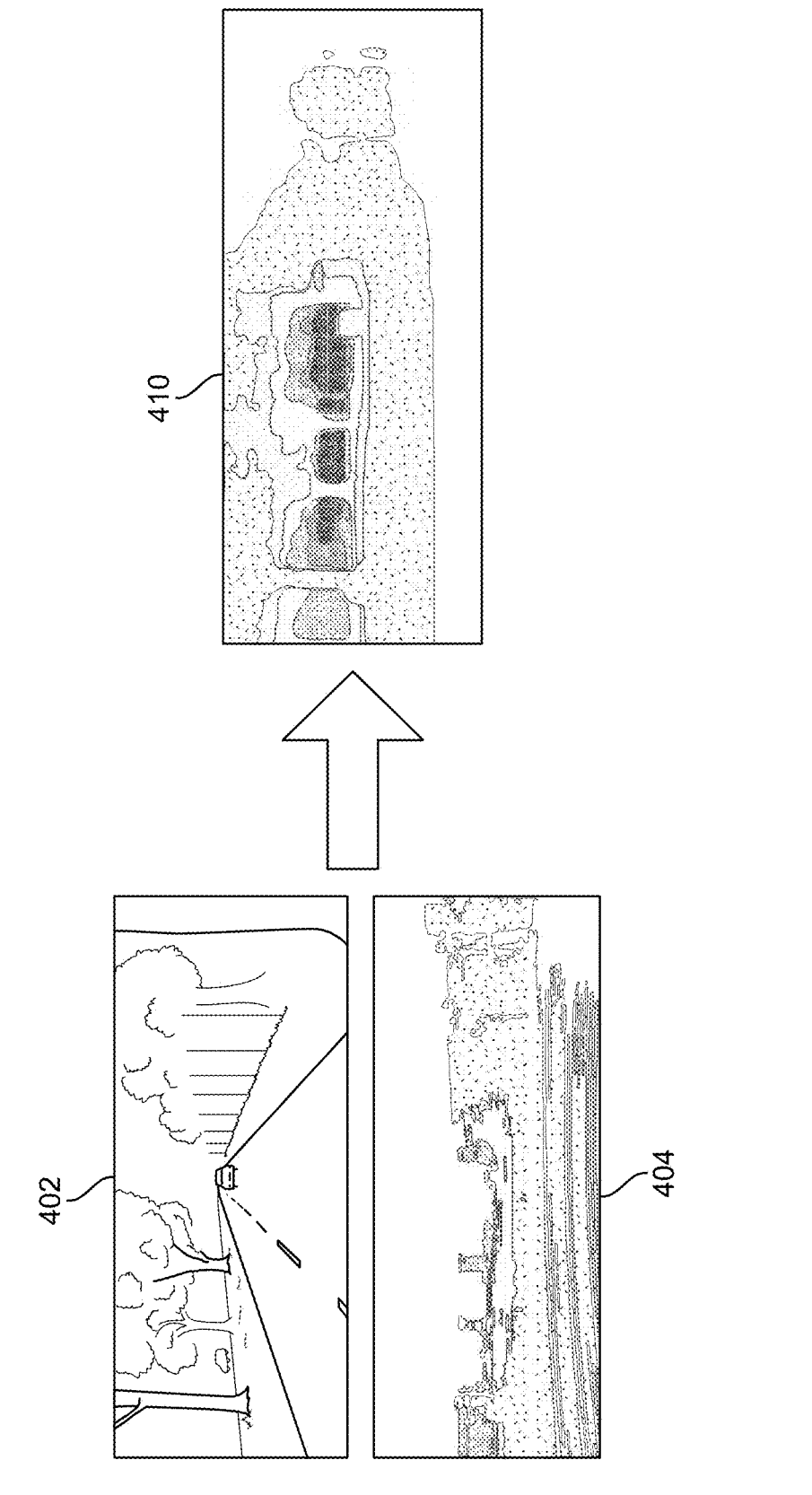
FIG. 4 illustrates an example of a completed depth map based on a single camera image and a lidar-based sparse depth information, in accordance with some examples.

FIG. 4 is a diagram 400 illustrating an example of depth completion 400, where an estimated completed depth map 410 is generated based on a single camera image 402 and lidar-based sparse depth information 404. In some examples, the lidar-based sparse depth information 404 can also be referred to as a lidar-based sparse depth map 404. In some examples, the completed depth map 410 can be generated based on estimating the distance of each pixel from the camera used to capture the single image 402. In some cases, the estimated completed depth map 410 can be used as the initial completed depth utilized by the systems and techniques described herein to perform 3D self-attention based depth refinement.

As noted previously, in some cases, existing approaches to performing depth completion may be based on iterative processing and/or iterative refinement of sparse depth features in order to achieve high-quality depth completion (e.g., to generate high-quality completed depth maps, also referred to as dense depth maps). The iterative processing and/or iterative refinement of sparse depth features and/or dense depth features utilizes deformable convolutions or dynamic graph propagation techniques, both of which are computationally complex. The computational complexity of deformable convolutions and dynamic graph propagation techniques makes it challenging to implement iterative processing-based depth completion techniques on computationally constrained and/or power-constrained devices (e.g., also referred to as "resource-constrained" devices), such as smartphones, tablets, and/or various other mobile computing devices, etc.

Figures 5A, 5B:
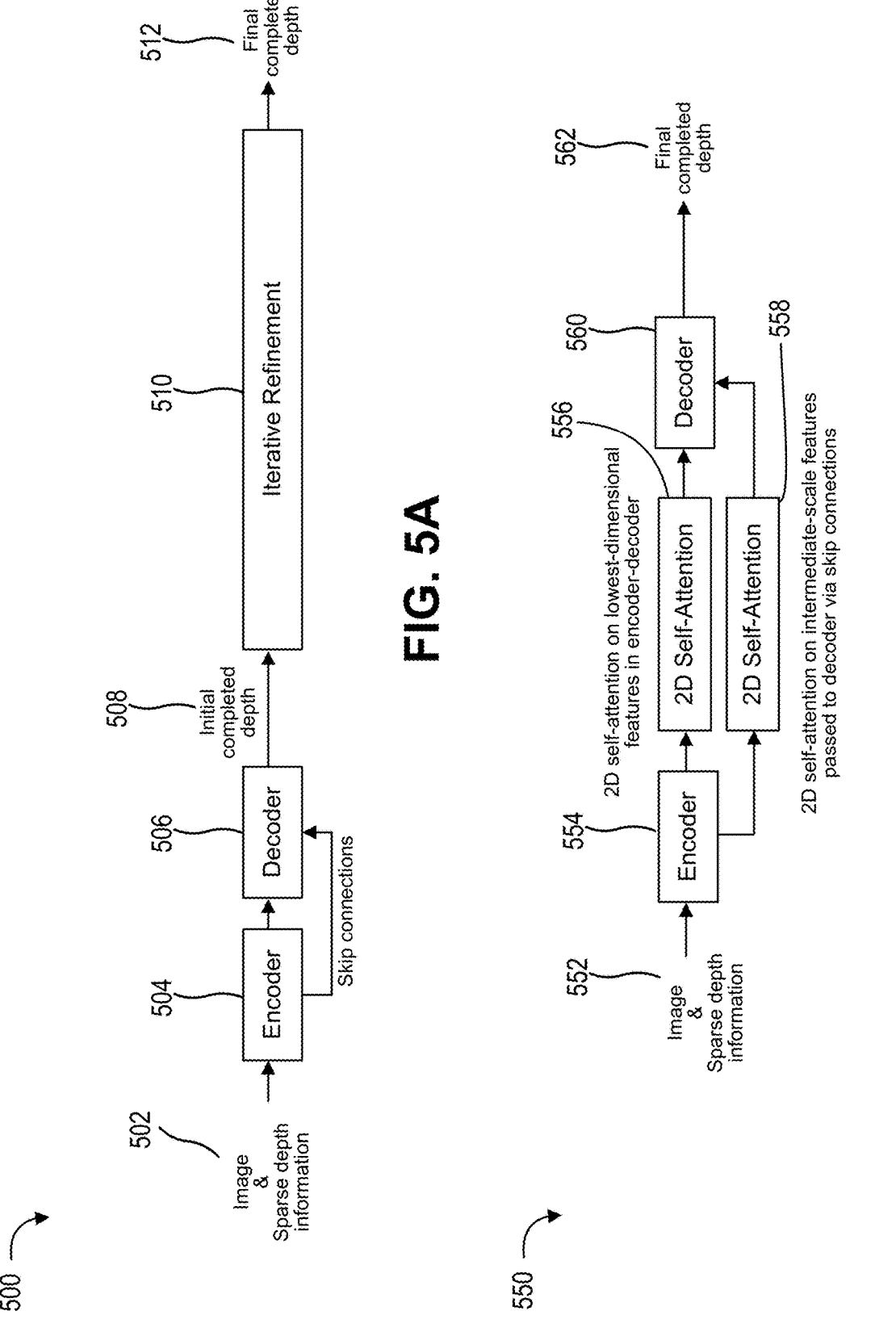
FIG. 5A is a diagram illustrating an example of depth completion using iterative processing refinement, in accordance with some examples.
FIG. 5B is a diagram illustrating an example of depth completion using two-dimensional (2D) self-attention without iterative refinement, in accordance with some examples.

FIG. 5A is a diagram illustrating an example of a depth completion machine learning network 500 using iterative processing refinement, in accordance with some examples. For instance, an input 502 can include a single camera image and sparse depth information, the same as or similar to one or more of the image 302 and ToF-based sparse depth information 304 of FIG. 3 and/or the image 402 and lidar-based sparse depth information 404 of FIG. 4. A machine learning encoder 504 and decoder 506 can be used to generate an initial completed depth estimation 508, which includes estimated depth information for each pixel that was missing depth information in the sparse depth input 502. The encoder 504 and decoder 506 can be included in a machine learning-based encoder-decoder architecture, and may utilize one or more skip connections between the encoder 504 and decoder 506. The initial completed depth estimation 508 can subsequently be processed using an iterative refinement engine 510 (e.g., which can correspond to and/or implement one or more of the iterative refinement techniques depicted in Table 1, above). Based on performing the iterative refinement, which utilizes computationally intensive deformably convolutions or dynamic graph propagation, the iterative refinement engine 510 generates final completed depth information 512.

In some cases, near state-of-the-art accuracy can be achieved without performing any iterative refinement, based on leveraging 2D self-attention in a machine-learning based depth completion network. For instance, FIG. 5B is a diagram illustrating an example of depth completion machine learning system 550 using two-dimensional (2D) self-attention without iterative refinement, in accordance with some examples.

An input 552 may be the same as or similar to the input 502 of FIG. 5A. An encoder 554 can be the same as or similar to the encoder 504 of FIG. 5A. The depth features generated by the encoder 554 of FIG. 5B can be provided as input to a first 2D self-attention sub-network 556 and a second 2D self-attention sub-network 558. The 2D self-attention sub-networks 556 and 558 can include one or more self-attention and/or transformer layers configured to implement self-attention over an input set of 2D depth features (e.g., the depth features generated by the encoder 554).

In some aspects, the first 2D self-attention sub-network 556 can be configured to implement 2D self-attention on the smallest spatial dimension features generated by the encoder 554 (e.g., based on the encoder 554 generating as output a plurality of depth features that are multi-scale, including a subset of relatively high spatial dimension features and a subset of relatively low spatial dimension features). In some cases, the smallest spatial dimension features may also be referred to as the lowest spatial dimension features from encoder 554. In some cases, the subset of low spatial dimensional features processed by the first 2D self-attention sub-network 556 can be obtained as the encoder 554 features that are less than a configured threshold value for spatial dimensionality.

The second 2D self-attention sub-network 558 can be configured to implement 2D self-attention for all intermediate-scale features from the encoder 554. For instance, the second 2D self-attention sub-network 558 may implement 2D self-attention on all intermediate-scale features that are passed from the encoder 554 to the decoder 560 using one or more skip connections.

The decoder 560 can be associated with the encoder 554 of FIG. 5B (e.g., included in an encoder-decoder machine learning architecture with the encoder 554, etc.). The decoder 560 can be the same as or similar to the decoder 506 of FIG. 5A. In some aspects, the decoder 560 can be configured to generate the final completed depth information 562 (e.g., final completed depth map, or refined completed depth map) based on the respective outputs from the first 2D self-attention sub-network 556 and the second 2D self-attention sub-network (558).

In some aspects, the encoder 554 and decoder 560 can be included in an encoder-decoder architecture that utilizes multi-scale visual features (e.g., in this examples, multi-scale depth features corresponding to the input image 552). For instance, the multi-scale depth features can include features of various different scales. Different feature scales may correspond to different spatial dimensionality of the features generated by the encoder 554. For instance, the plurality of multi-scale features generated by the encoder 554 may include one or more relatively high spatial dimensional features, one or more intermediate spatial dimensional features, and one or more low spatial dimensional features.

In some cases, the first 2D self-attention sub-network 556 and the second 2D self-attention sub-network 558 can be included in a self-attention module of the machine learning architecture of the depth completion machine learning system 550 of FIG. 5B. For instance, the self-attention module can apply self-attention to the multi-scale visual features from the encoder 554 to generate attended multi-scale visual features. The attended multi-scale visual features can be provided to the decoder 560 and used to generate the final completed depth map 562. For example, in some aspects, the attended multi-scale visual features generated by the first 2D self-attention sub-network 556 and the second 2D self-attention sub-network 558 may be supplied to the decoder 560. The decoder 560 may decode the attended multi-scale visual features to generate the dense (e.g., completed) depth map 562, which may also be referred to as a final depth estimate. Beneficially, the depth completion machine learning system 550 may generate the dense depth map 562 without the iterative refinement (e.g., refinement engine 510 of FIG. 5A) employed in the conventional depth completion approach performed by the depth completion machine learning network 500 of FIG. 5A. That is, the example architecture 550 of FIG. 5B may generate the dense depth map 562 by applying self-attention (e.g., using the self-attention module comprising the 2D self-attention sub-networks 556 and 558) to the extracted multi-scale visual features rather than employing deformable convolutions or dynamic graph propagation. As described, the iterative refinement including deformable convolutions, dynamic graph propagation, or other spatial propagation techniques are computationally complex and may involve significant memory and power consumption. Moreover, unlike the conventional techniques involving deformable convolutions or dynamic graph propagations, the example depth completion machine learning system 550 utilizes self-attention (e.g., the 2D self-attention sub-networks 55 and 558), which may be supported on-device. As, such, using the example depth completion machine learning system 550, a dense depth map 562 (e.g., depth completion) may be performed on an edge device or the like, such as a smartphone or other mobile device, for instance.

Systems and techniques are described herein for self-attention-based depth completion without using iterative refinement and with accuracy that is the same as or better than existing iterative refinement-based depth completion techniques.

Figure 6:
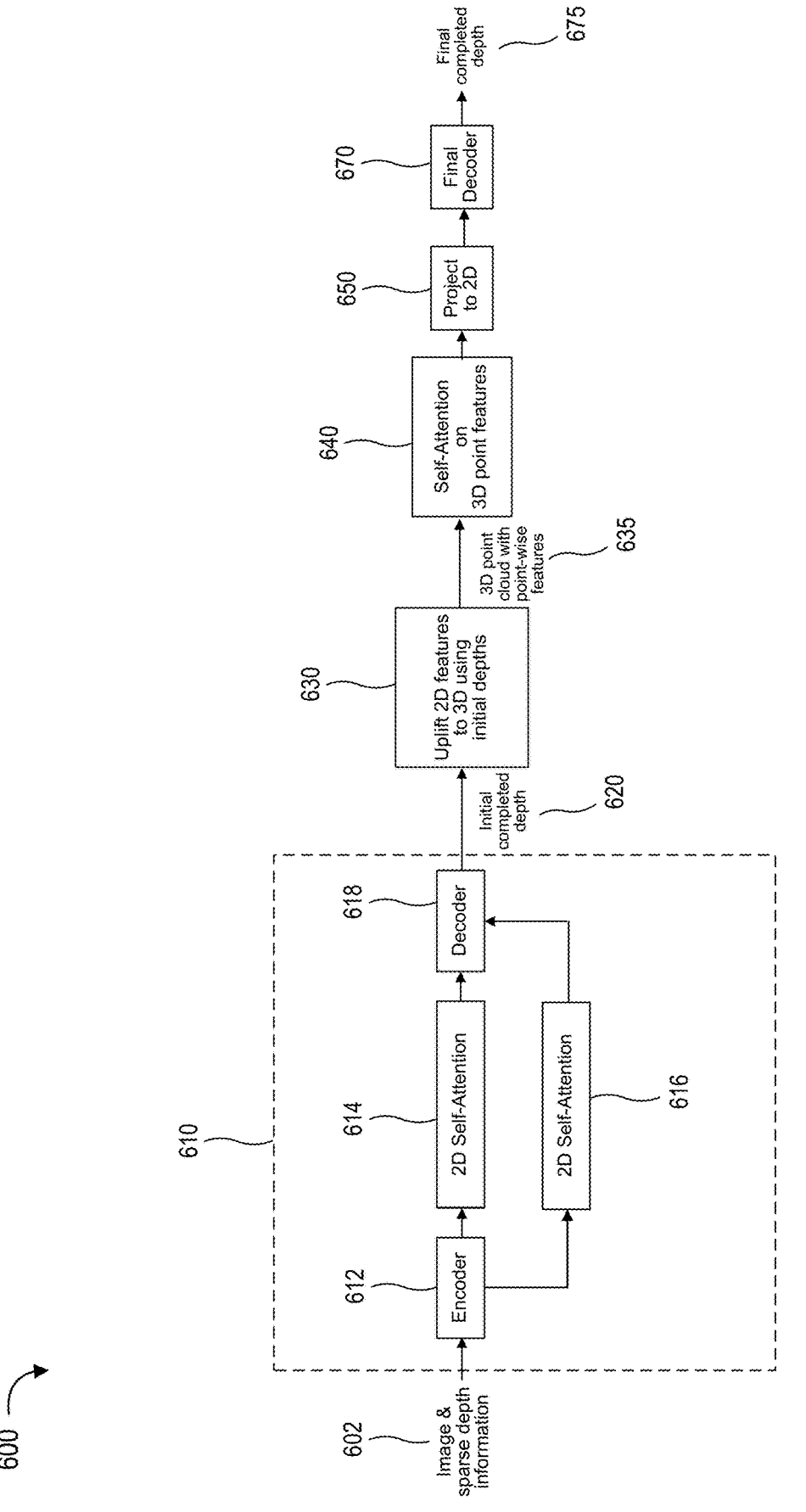
FIG. 6 is a diagram illustrating an example of a machine learning architecture for depth completion using three-dimensional (3D) self-attention without iterative refinement, in accordance with some examples.

FIG. 6 is a diagram illustrating an example of a machine learning architecture 600 that can be used to perform depth completion using three-dimensional (3D) self-attention without iterative refinement, in accordance with some examples.

The machine learning architecture 600 may receive an input 602 including an image and a corresponding sparse depth measurement. In various aspects, the image of input 602 may comprise a single image from a single camera. In some aspects, the image of input 602 may comprise a two-dimensional (2D) image. Additionally, the image of input 602 may comprise a red-green-blue (RGB) image, for instance. Although a single image is described for input 602, the machine learning architecture 600 may be configured to receive and process a sequence of images, such as a video or a streaming multimedia input. For instance, the video may include a sequence of video frames, in which each frame of the video may be considered an image. The sparse depth measurement of input 602 may comprise (but is not limited to) a LiDAR measurement, an RGB depth (RGBD) measurement, a time-of-flight (ToF) measurement, or other type of sparse depth measurements, for example. In some aspects, the image and the sparse depth measurement may be concatenated within input 602.

In one illustrative example, the machine learning architecture 600 can include a first depth completion machine learning network 610 that is configured to generate an initial completed depth map 620 (e.g., initial completed depth estimation) using an input 602 comprising a single image and sparse depth measurements (e.g., a sparse depth map corresponding to the single input image). In some aspects, the input 602 of FIG. 6 can be the same as or similar to the input 502 of FIG. 5A and/or the input 552 of FIG. 5B. For instance, the input 602 of FIG. 6 can include a single image that is the same as or similar to the image 302 of FIG. 3 and/or the image 402 of FIG. 4, etc. The input 602 of FIG. 6 can include corresponding sparse depth measurements that are the same as or similar to the ToF-based sparse depth map 304 of FIG. 3 and/or the lidar-based sparse depth map 404 of FIG. 4, etc.

In some aspects, the machine learning network 610 can be the same as or similar to the machine learning network shown in FIG. 5B (e.g., the machine learning network 610 of FIG. 6 can use an architecture the same as or similar to the architecture of the depth completion machine learning system 550 of FIG. 5B). In some examples, the encoder 612 of FIG. 6 can be the same as or similar to the encoder 554 of FIG. 5B. In some examples, the first 2D self-attention sub-network 614 of FIG. 6 can be the same as or similar to the first 2D self-attention sub-network 556 of FIG. 5B. In some cases, the second 2D self-attention sub-network 616 of FIG. 6 can be the same as or similar to the second 2D self-attention sub-network 558 of FIG. 5B. In some cases, the decoder 618 of FIG. 6 can be the same as or similar to the decoder 560 of FIG. 5B.

In one illustrative example, the initial completed depth estimate 620 of FIG. 6 can be the same as the final completed depth estimate 562 of FIG. 5B.

In some aspects, the machine learning architecture 600 of FIG. 6 can be configured to generate a final completed depth map 675 based on using 3D self-attention to refine the initial completed depth map estimate 620. The initial completed depth map estimate 620 can be refined without using iterative processing, dynamic graph propagation, or deformable convolutions. Various machine learning networks can be utilized as a baseline model or backbone architecture for generating the initial depth completion estimation 620 and corresponding two-dimensional (2D) depth features.

For instance, the initial depth completion estimation 620 can be generated using 2D self-attention sub-networks 614 and 616 to refine 2D sparse depth features generating by the encoder 612 from the input image and a sparse depth map (e.g., a ToF-based sparse depth map, a lidar-based sparse depth map, etc.) included in input 602. The initial depth completion estimation 620 can include or correspond to a plurality of 2D features (e.g., the encoder 2D depth features with the 2D self-attention imposed thereupon). In one illustrative example, the 2D features associated with the initial completed depth estimate 620 and the depth completion network 610 can be multi-scale visual features, as noted above.

From the initial depth completion estimation 620 (e.g., an initial completed depth map, also referred to as an initial dense depth map or initial dense depth map estimation), the machine learning architecture 600 can uplift the 2D features into corresponding 3D features 635. For instance, a point cloud generation engine 630 can be used to uplift the 2D features to 3D features 635, based on using the depth information from the initial depth completion estimation 620. In one illustrative example, the point cloud generation engine 630 generates the uplifted 3D features as a 3D point cloud 635 with a plurality of respective point-wise features corresponding to the initial depth completion estimation 620.

Depth completion may be viewed as a 3D perception task. The systems and techniques described herein can leverage stronger representation and learning in three dimensions, based on utilizing the 3D self-attention engine 640 to perform attention-based refinement for the 3D point cloud 635 point-wise features. In some aspects, the 3D self-attention engine 640 of FIG. 6 can be the same as or similar to the 3D self-attention engine 740b of FIG. 7B.

The 3D point cloud 635 with point-wise features can be provided to one or more 3D self-attention layers (e.g., transformer-based machine learning layers) included in the 3D self-attention engine 640. In some aspects, the 3D self-attention engine 640 can be configured to perform attention-based refinement of the 3D point cloud features 635, based on using the one or more self-attention and/or transformer-based layers to refine respective 3D features included in the plurality of pointwise 3D features of the uplifted 3D point cloud 635.

The 3D self-attention engine 640 can generate a corresponding plurality of refined 3D depth features corresponding to the plurality of uplifted 3D depth features included in the 3D point cloud 635.

At block 650, the refined 3D depth features generated by the self-attention engine 640 can be projected back to the 2D image plane (e.g., the 2D image plane associated with or corresponding to the input 602 image).

A final decoder 670 can generate the final completed depth map 675 based on the 2D projection of the refined 3D depth features generated by the 3D self-attention engine 640. In some aspects, the final completed depth map 675 may also be referred to as a refined depth map and/or a refined completed depth map.

Figure 7A:
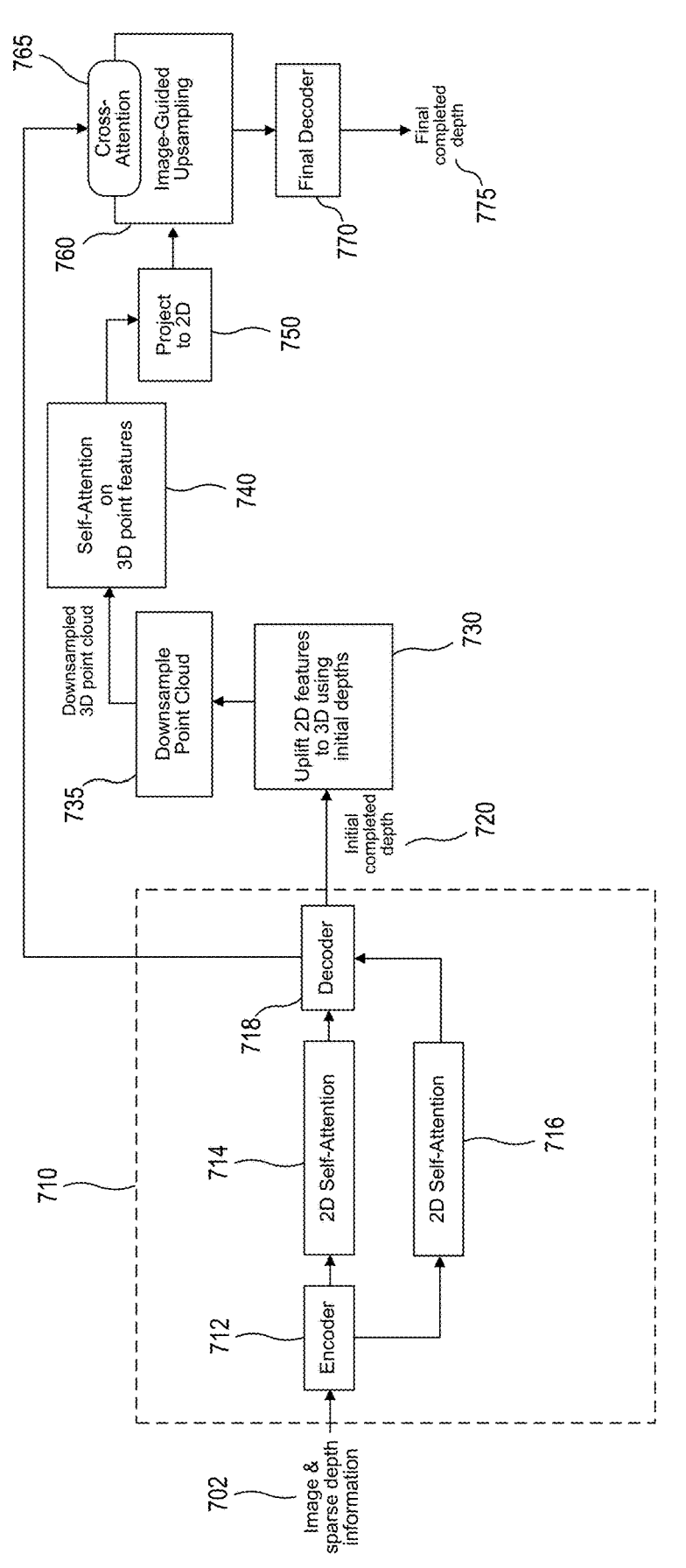
FIG. 7A is a diagram illustrating an example of a machine learning architecture for depth completion using 3D self-attention on downsampled 3D point cloud features without iterative refinement, in accordance with some examples.

FIG. 7A is a diagram illustrating an example of a machine learning architecture 700 that can be used to generate a refined completed depth map 775 based on applying 3D self-attention to a downsampled 3D point cloud of uplifted 2D to 3D features. In some aspects, the machine learning architecture 700 of FIG. 7A can be similar to the machine learning architecture 600 of FIG. 6.

For instance, the input 702 can be the same as or similar to the input 602 of FIG. 6; the initial depth completion network 710 can be the same as or similar to the initial depth completion network 610 of FIG. 6; the encoder 712 can be the same as or similar to the encoder 612 of FIG. 6; the first and second 2D self-attention sub-networks 714 and 716 (respectively) can be the same as or similar to the first and second 2D self-attention sub-networks 614 and 616 (respectively) of FIG. 6; the decoder 718 can be the same as or similar to the decoder 618 of FIG. 6; the initial completed depth estimate 720 can be the same as or similar to the initial completed depth estimate 620 of FIG. 6; the point cloud generation engine 730 can be the same as or similar to the point cloud generation engine 630 of FIG. 6; etc.

In one illustrative example, the point cloud generation engine 730 of FIG. 7A can generate a 3D point cloud comprising a plurality of pointwise 3D features that are uplifted from the multi-scale 2D features corresponding to the 2D image plane associated with the input image 702 and used by the encoder 712 in generating the multi-scale 2D features. For instance, the output of point cloud generation engine 730 of FIG. 7A can be the same as or similar to the 3D point cloud 635 generated by the point cloud generation engine 630 of FIG. 7A.

The point cloud of 3D features can be provided from the point cloud generation engine 730 to a downsampling engine 735, which can be configured to downsample the 3D point cloud into a smaller 3D point cloud of the point-wise uplifted features. In one illustrative example, the downsampling engine 735 can perform downsampling based on reducing the number of points included in the input 3D point cloud received from the uplifting engine 730. In some aspects, the uplifting engine 730 generates a point cloud of pointwise 3D features that includes a respective 3D feature corresponding to each 2D feature of the plurality of 2D features associated with the initial completed depth map 720. In some examples, the downsampling engine 735 generates a downsampled point cloud that includes a respective 3D feature corresponding to only a portion of the plurality of 2D features associated with the initial completed depth map 720. For instance, the number of features included in the downsampled 3D point cloud generated by the downsampling engine 735 can be less than the number of features included in the uplifted 3D point cloud (e.g., generated by the uplifting engine 730) and can be less than the number of 2D features associated with the initial completed depth map estimate 720.

In one illustrative example, the downsampled 3D point cloud features can be provided to a 3D self-attention engine 740 that may be the same as or similar to the 3D self-attention engine 640 of FIG. 6. The 3D self-attention engine 740 can apply self-attention to refine the downsampled 3D point cloud features from the downsampling engine 735. In some aspects, the 3D self-attention engine 740 of FIG. 7A may be the same as or similar to the 3D self-attention engine 740b of FIG. 7B.

At block 750, the refined downsampled 3D features generated by the 3D self-attention engine 740 can be projected back to the 2D image plane (e.g., the 2D image plane associated with or corresponding to the input 702 image). In some aspects, the 3D-to-2D feature projection 750 of FIG. 7A can be the same as or similar to the 3D-to-2D feature projection 650 of FIG. 6.

The 2D feature projection from block 750 can be provided to an image-guided upsampling engine 760 configured to perform image-guided upsampling to return the 2D feature projection back to its original resolution (e.g., the same resolution as the features right before the output layer in the non-downsampled model architecture of FIG. 6). In one illustrative example, the image-guided upsampling engine 760 can include one or more cross-attention transformer layers 765 that can be used to perform image-guided upsampling.

For instance, in some examples, the 2D features associated with the initial decoder 718 can be provided to the cross-attention layers 765 and used as the query value(s) (e.g., Q) for calculating cross-attention. The 3D-to-2D projected features provided as input to the image-guided upsampling engine 765 can be used as the key (e.g., K) and value (e.g., V) inputs to the cross-attention calculation performed by the cross-attention layers 765. In some examples, using the Q, K, and V information noted above, the image-guided upsampling engine 760 can use the cross-attention layers 765 to generate upsampled 2D features corresponding to the refined 3D features.

In another illustrative example, the image-guided upsampling engine 760 can be configured to first upsample the 3D-to-2D projected features (e.g., from the projection engine 750) to the desired resolution and/or to the original resolution (e.g., same resolution as the features right before the output layer in the non-downsampled model architecture of FIG. 6). In some aspects, the upsampled 3D-to-2D projected features can be provided to the cross-attention layers 765 as the query Q information, and the decoder 718 2D features can be provided to the cross-attention layers 765 as the respective key K and value V information for calculating the cross-attention.

In another illustrative example, the image-guided upsampling engine and cross-attention layers 765 may utilize encoder features, such as the multi-scale 2D depth features generated by the encoder 712. For instance, the encoder 712 features can be utilized (e.g., instead of the decoder 718 features) in either one or both of the two examples above for image-guided upsampling performed by the image-guided upsampling engine 760. In some aspects, the systems and techniques can generate upscaled or upsampled 2D features corresponding to the refined 3D features, based on using non-guided upsampling.

The systems and techniques described herein can be used to generate refined depth completion maps based on leveraging 3D self-attention to process features in a 3D space for depth completion. The systems and techniques can be implemented without requiring iterative refinement, without requiring deformable operations, and without requiring dynamic graph propagation. The systems and techniques can be used to more efficiently perform depth completion and/or refinement of depth completion maps, including on resource-constrained devices. In some cases, efficiency of the 3D self-attention-based depth completion and refinement can be improved based on downsampling 3D feature point clouds, as described in the example of FIG. 7A. Downsampling the 3D feature point cloud can reduce the complexity and size of the attention calculations, and 2D guided feature upsampling can be used to restore the refined features to the original resolution.

Figure 7B:
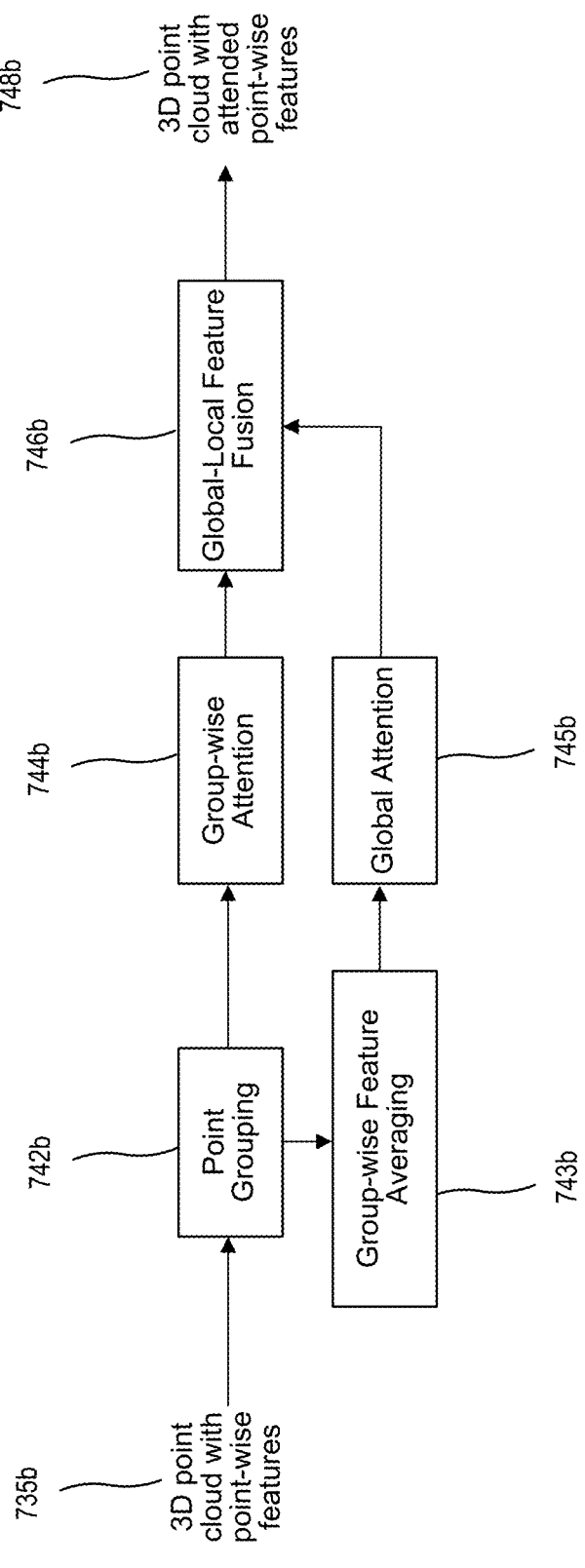
FIG. 7B is a diagram illustrating an example of a machine learning architecture that can be used to implement 3D self-attention, in accordance with some examples.

FIG. 7B is a diagram illustrating an example of a machine learning architecture 740b that can be used to implement 3D self-attention, in accordance with some examples. For instance, the machine learning architecture 740b can be used to implement 3D self-attention for depth completion, including depth completion performed based on one or more of the machine learning architecture 600 of FIGS. 6 and/or 700 of FIG. 7A, etc.

In one illustrative example, the 3D self-attention machine learning architecture 740b of FIG. 7B can be used to implement the 3D self-attention engine 640 of FIG. 6 and/or can be used to implement the 3D self-attention engine 740 of FIG. 7A. For example, the 3D self-attention machine learning architecture 740b of FIG. 7B can be the same as or similar to the 3D self-attention engine 640 of FIG. 6 and/or can be the same as or similar to the 3D self-attention engine 740 of FIG. 7A.

In some aspects, the 3D point cloud 735b of FIG. 7B can be a 3D point cloud with point-wise features, and may be generated using the 2D feature uplift engine 630 of FIG. 6 (e.g., 3D point cloud 735b of FIG. 7B and 3D point cloud 635 of FIG. 6 can be the same). In another example, the 3D point cloud 735b of FIG. 7B can be the same as or similar to the 3D point cloud output generated by the 2D feature uplift engine 730 of FIG. 7A and/or the 3D point cloud output generated by the downsampling engine 735 of FIG. 7A.

In one illustrative example, the 3D self-attention machine learning architecture 740b can be configured to perform point grouping 742b for the input of 3D point cloud 735b with point-wise features. For instance, the point grouping 742b can be used to group the plurality of 3D points based on proximity (e.g., the plurality of 3D points included in the input 3D point cloud 735b provided to the 3D self-attention machine learning architecture 740b). In some aspects, the point grouping 742b can be performed based on proximity between respective ones of the plurality of 3D points of 3D point cloud 735b, and based on a configured or desired number of groups. For example, the output of point grouping 742b can be the 3D points of 3D point cloud 735b clustered into the configured number of groups, with the clustering performed based on proximity between the points. In one illustrative example, the desired number of groups can be obtained based on using the point grouping 742b to implement various clustering algorithms, such as K-Means clustering, etc., among various others.

The groups of 3D points generated or determined using the point grouping engine 742b can be provided to one or more group-wise attention layers 744b and to a group-wise feature averaging engine 743b. In some examples, the one or more group-wise attention layers 744b can be self-attention layers. For instance, the one or more group-wise attention layers 744b can determine or perform self-attention on the respective 3D points within each group of the configured number of groups generated by the point grouping engine 742b. Each respective group of the configured number of groups generated by the point grouping engine 742b can include a subset of the plurality of 3D points of the input 3D point cloud 735b. Each respective group can include one or more 3D points.

The group-wise feature averaging engine 743b can be used to determine an average feature for the respective 3D points included in each 3D point group. For instance, each 3D point of the input 3D point cloud 735b can be associated with a corresponding point-wise feature or feature information. Based on averaging the corresponding point-wise feature associated with each 3D point of the subset of 3D points included within a respective one of the 3D point groups, the group-wise feature averaging engine 743b can determine the average feature for the 3D points in each 3D point group.

Based on the average feature for the 3D points in each 3D point group (e.g., determined using the group-wise feature averaging engine 743*b*), a global attention engine 745*b* can be used to determine self-attention over the averaged features from the 3D point groups. The global attention engine 745*b* can include one or more self-attention layers and may generate as output a corresponding globally attended group-average feature for each respective one of the 3D point groups.

A global-local feature fusion engine 746*b* can be used to perform feature fusion between the globally attended group-average feature determined for each 3D point group (e.g., determined using the global attention engine 745*b*) and the individual 3D point features within the 3D point group (e.g., obtained by global-local feature fusion engine 746*b* from the group-wise attention layers 744*b*). Based on performing the global-local feature fusion of the globally attended group-average features and the individual point features within each 3D point group (e.g., using the global-local feature fusion engine 746*b*), the 3D self-attention machine learning architecture 740*b* of FIG. 7B can be used to generate a 3D point cloud 748*b* with attended point-wise features. In some aspects, the 3D point cloud 748*b* with attended point-wise features can correspond to the input 3D point cloud 735*b* with point-wise features.

In one illustrative example, where the 3D self-attention machine learning architecture 740*b* of FIG. 7B is used to implement the 3D self-attention engine 640 of FIG. 6, the 3D point cloud 748*b* with attended point-wise features can be provided to the 2D projection engine 650 of FIG. 6 and subsequently used to determine the final completed depth information 675 of FIG. 6. In another illustrative example, where the 3D self-attention machine learning architecture 740*b* of FIG. 7B is used to implement the 3D self-attention engine 740 of FIG. 7A, the 3D point cloud 748*b* with attended point-wise features can be provided to the 2D projection engine 750 of FIG. 7A and subsequently used to determine the final completed depth information 775 of FIG. 7A.

FIG. 8 is a flowchart diagram illustrating an example of a process 800 for generating depth information from one or more images using one or more of the techniques described herein. The process 800 can be performed by a computing device (or apparatus), or a component or system (e.g., one or more chipsets, one or more processors such as one or more CPUs, DSPs, NPUs, NSPs, microcontrollers, ASICs, FPGAs, programmable logic devices, discrete gates or transistor logic components, discrete hardware components, etc., any combination thereof, and/or other component or system) of the computing device or apparatus, utilizing or implementing a neural network or other machine learning model and/or architecture (e.g., the machine learning architecture 600 of FIG. 6, the machine learning architecture 700 of FIG. 7A, etc.). The operations of the process 800 may be implemented as software components that are executed and run on one or more processors (e.g., processor 1110 of FIG. 11 or other processor(s)). In some examples, the process 800 can be performed by a computing device comprising a smartphone, mobile computing device, user computer device, etc. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device.

At block 802, the computing device (or component thereof) can obtain a first depth map corresponding to an input comprising an image of the one or more images and a sparse depth measurement. For instance, the input comprising an image and a sparse depth measurement can be the same as or similar to the image and sparse depth information 502 of FIG. 5A, 552 of FIG. 5B, 602 of FIG. 6, 702 of FIG. 7A, etc.

In some cases, the first depth map is an initial dense depth map estimate corresponding to the input. For instance, the first depth map can be the same as or similar to the initial depth map estimate of the initial completed depth map 508 of FIG. 5A, 620 of FIG. 6, and/or 720 of FIG. 7A, etc. In some examples, obtaining the first depth map comprises receiving a dense depth map estimate generated based on the input by a depth completion machine learning network. For instance, the depth completion machine learning network can be the same as or similar to the depth completion machine learning network 500 of FIG. 5A, 550 of FIG. 5B, 610 of FIG. 6, and/or 710 of FIG. 7A.

In some cases, obtaining the first depth map includes receiving the input comprising the image and the sparse depth measurement and extracting, using an encoder of a depth completion machine learning network, the multi-scale visual features from the image. For instance, the encoder can be the same as or similar to one or more of the encoder 504 of FIG. 5A, 554 of FIG. 5B, 612 of FIG. 6, and/or 712 of FIG. 7A.

In some examples, the multi-scale visual features from the encoder can be processed using one or more 2D self-attention sub-networks of the depth completion machine learning network to generate attended multi-scale visual features. For instance, the 2D self-attention sub-networks can be the same as or similar to the 2D self-attention sub-networks 556, 558 of FIG. 5B; 614, 616 of FIG. 6; and/or 714, 716 of FIG. 7A; etc. In some cases, the attended multi-scale visual features can be provided to a decoder of the depth completion machine learning network. The decoder can be the same as or similar to one or more of the decoder 506 of FIG. 5A, 560 of FIG. 5B, 618 of FIG. 6, and/or 718 of FIG. 7A, etc. In some examples, the depth completion machine learning network can be used to generate the first depth map based on the attended multi-scale visual features.

At block 804, the computing device (or component thereof) can generate a three-dimensional (3D) point cloud based on the first depth map and multi-scale visual features of the input, wherein the 3D point cloud includes a plurality of 3D point features uplifted from the multi-scale visual features. For instance, the 3D point cloud can be the same as or similar to the 3D point cloud 635 of FIG. 6 and/or the 3D point cloud generated as output by the uplifting engine 730 of FIG. 7A. The first depth map and multi-scale visual features can be the same as or similar to the initial completed depth information 620 of FIGS. 6 and/or 720 of FIG. 7A.

In some cases, the multi-scale visual features of the input comprise a plurality of 2D features generated based on the input and associated with the first depth map. In some examples, to generate the 3D point cloud, the multi-scale visual features of the input can be uplifted to the plurality of 3D point features, for instance using the 2D-3D uplifting engine 630 of FIGS. 6 and/or 730 of FIG. 7A. In some cases, the multi-scale visual features are 2D features associated with a 2D image plane corresponding to the image. In some examples, each respective 3D point feature of the plurality of 3D point features is associated with a corresponding 2D feature of the multi-scale visual features. In some cases, a respective multi-scale visual feature can be uplifted based on a corresponding pixel location associated with the respective multi-scale visual feature, wherein the corresponding pixel location is within the image.

In some examples, the 3D point cloud can be downsampled to generate a downsampled 3D point cloud, wherein the downsampled 3D point cloud includes a subset of the plurality of 3D point features. For instance, the point cloud downsampling engine 735 of FIG. 7A can be used to generate a downsample 3D point cloud that is the same as or similar to the smaller 3D point cloud of FIG. 7A.

At block 806, the computing device (or component thereof) can process at least a portion of the plurality of 3D point features using one or more self-attention layers to generate refined 3D point features. For instance, the one or more self-attention layers can be the same as or similar to the self-attention layers 640 of FIGS. 6 and/or 740 of FIG. 7A. In some aspects, the plurality of 3D point features can be processed using one or more self-attention layers of the 3D self-attention machine learning architecture 740*b* of FIG. 7B. In some cases, the subset of the plurality of 3D point features included in the downsampled 3D point cloud (e.g., downsampled 3D point cloud of FIG. 7A) and the at least a portion of the plurality of 3D point features are the same.

In some cases, the refined 3D point features can be generated as output of the self-attention layers 640 of FIG. 6 and/or generated as output of the self-attention layers 740 of FIG. 7A. In some aspects, the refined 3D point features can be generated as output of the 3D self-attention machine learning architecture 740*b* of FIG. 7B. For instance, the refined 3D point features may be the same as or similar to the 3D point cloud 748*b* with attended point-wise features generated by the 3D self-attention machine learning architecture 740*b* of FIG. 7B. In some examples, the refined 3D point features comprises attended 3D point features generated based on the plurality of 3D point features and using the one or more self-attention layers.

At block 808, the computing device (or component thereof) can generate a two-dimensional (2D) projection of the refined 3D point features. For instance, the 2D projection of the refined 3D point features can be generated using a 3D-2D projection engine that is the same as or similar to the 3D-2D projection engine 650 of FIGS. 6 and/or 750 of FIG. 7A.

At block 810, the computing device (or component thereof) can generate a second depth map based on the 2D projection of the refined 3D point features. For instance, the second depth map can be the same as or similar to the final completed depth 562 of FIG. 5B, the final completed depth 675 of FIG. 6, and/or the final completed depth 775 of FIG. 7A. In some cases, the second depth map is a refined dense depth map estimate corresponding to the input and the initial dense depth map estimate.

In some examples, generating the refined 3D point features comprises processing each respective 3D point feature of the downsampled 3D point cloud (e.g., output from downsampling engine 735 of FIG. 7A) using the one or more self-attention layers (e.g., self-attention layers 640 of FIG. 6, 740 of FIG. 7A, self-attention layers included in the 3D self-attention machine learning architecture 740*b* of FIG. 7B, etc.,) to generate attended downsampled 3D point features, wherein the attended downsampled 3D point features and the refined 3D point features are the same.

In some examples, the second depth map can be generated based on performing image-guided upsampling of a 2D projection of the attended downsampled 3D point features. For instance, the image-guided upsampling can be performed using an image-guided upsampling engine the same as or similar to the image-guided upsampling engine 760 of FIG. 7A. In some cases, an upsampled 2D projection of the attended downsampled 3D point features and the multi-scale visual features of the input have a same spatial resolution. In some examples, the second depth map can be generated based on the upsampled 2D projection, for instance based on providing the upsampled 2D projection from upsampling engine 760 of FIG. 7A to a final decoder 770 of FIG. 7A to generate the final completed depth 775 of FIG. 7A.

In some examples, the image-guided upsampling can be performed based on processing, using one or more cross-attention layers, the multi-scale visual features of the input as an attention query (Q). For instance, the image-guided upsampling can be performed based on using the cross-attention layers 765 of FIG. 7A to process the multi-scale visual features of the input as an attention query. In some cases, the one or more cross-attention layers can be used to process the 2D projection of the attended downsampled 3D point features as an attention key (K) and an attention value (V).

In some cases, the multi-scale visual features of the input are extracted from the image by a decoder of a depth completion machine learning network (e.g., the same as or similar to the decoder 618 of FIGS. 6 and/or 718 of FIG. 7A). In some examples, the multi-scale visual features of the input are extracted from the image by an encoder of a depth completion machine learning network (e.g., the same as or similar to the encoder 612 of FIGS. 6 and/or 712 of FIG. 7A). In some examples, performing the image-guided upsampling includes using one or more cross-attention layers (e.g., cross-attention layers 765 of FIG. 7A) to process upsampled 3D-to-2D projected features as an attention query (Q), and to process, using the one or more cross-attention layers, one or more decoder features corresponding to the input as an attention key (K) and an attention value (V). In some aspects, one or more cameras are configured to capture the one or more images.

As noted above, the processes described herein (e.g., process 800 and/or any other process described herein) may be performed by a computing device or apparatus utilizing or implementing a neural network or other machine learning model and/or architecture (e.g., the machine learning architecture 600 of FIG. 6, the machine learning architecture 700 of FIG. 7A, etc.). In one example, the process 800 can be performed by the electronic device 100 of FIG. 1. In another example, the process 800 can be performed by the computing system having the computing device architecture of the computing system 1100 shown in FIG. 11 utilizing or implementing a neural network or other machine learning model and/or architecture (e.g., the machine learning architecture 600 of FIG. 6, the machine learning architecture 700 of FIG. 7A, etc.). For instance, a computing device with the computing device architecture of the computing system 1100 shown in FIG. 11 can implement the operations of FIG. 8 and/or the components and/or operations described herein with respect to any of FIGS. 3 through 8.

The computing device can include any suitable device, such as a mobile device (e.g., a mobile phone), a desktop computing device, a tablet computing device, an XR device (e.g., a VR headset, an AR headset, AR glasses, etc.), a wearable device (e.g., a network-connected watch or smartwatch, or other wearable device), a server computer, a vehicle (e.g., an autonomous vehicle) or computing device of the vehicle, a robotic device, a laptop computer, a smart television, a camera, and/or any other computing device with the resource capabilities to perform the processes described herein, including the process 800 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 800 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
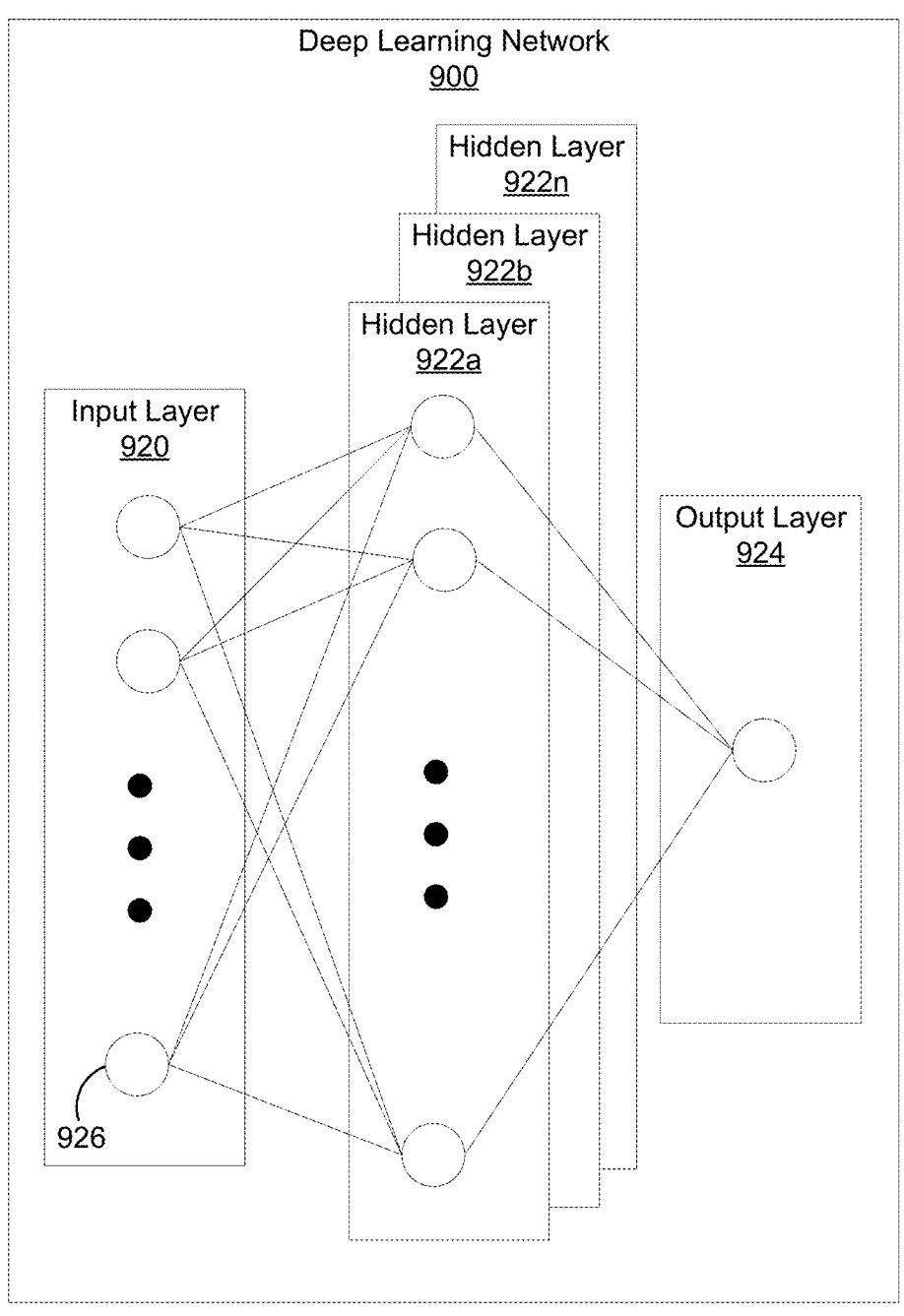
FIG. 9 is a block diagram illustrating an example of a deep learning network, in accordance with some examples.

FIG. 9 is an illustrative example of a deep learning neural network 900 that can be used by the machine learning architecture 600 of FIG. 6 and/or the machine learning architecture 700 of FIG. 7A. An input layer 920 includes input data. In one illustrative example, the input layer 920 can include data representing the pixels of an input video frame. The neural network 900 includes multiple hidden layers 922a, 922b, through 922n. The hidden layers 922a, 922b, through 922n include "n" number of hidden layers, where "n" is an integer greater than or equal to one. The number of hidden layers can be made to include as many layers as needed for the given application. The neural network 900 further includes an output layer 924 that provides an output resulting from the processing performed by the hidden layers 922a, 922b, through 922n. In one illustrative example, the output layer 924 can provide a classification for an object in an input video frame. The classification can include a class identifying the type of object (e.g., a person, a dog, a cat, or other object).

The neural network 900 is a multi-layer neural network of interconnected nodes. Each node can represent a piece of information. Information associated with the nodes is shared among the different layers and each layer retains information as information is processed. In some cases, the neural network 900 can include a feed-forward network, in which case there are no feedback connections where outputs of the network are fed back into itself. In some cases, the neural network 900 can include a recurrent neural network, which can have loops that allow information to be carried across nodes while reading in input.

Information can be exchanged between nodes through node-to-node interconnections between the various layers. Nodes of the input layer 920 can activate a set of nodes in the first hidden layer 922a. For example, as shown, each of the input nodes of the input layer 920 is connected to each of the nodes of the first hidden layer 922a. The nodes of the hidden layers 922a, 922b, through 922n can transform the information of each input node by applying activation functions to the information. The information derived from the transformation can then be passed to and can activate the nodes of the next hidden layer 922b, which can perform their own designated functions. Example functions include convolutional, up-sampling, data transformation, and/or any other suitable functions. The output of the hidden layer 922b can then activate nodes of the next hidden layer, and so on. The output of the last hidden layer 922n can activate one or more nodes of the output layer 924, at which an output is provided. In some cases, while nodes (e.g., node 926) in the neural network 900 are shown as having multiple output lines, a node has a single output and all lines shown as being output from a node represent the same output value.

In some cases, each node or interconnection between nodes can have a weight that is a set of parameters derived from the training of the neural network 900. Once the neural network 900 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 900 to be adaptive to inputs and able to learn as more and more data is processed.

The neural network 900 is pre-trained to process the features from the data in the input layer 920 using the different hidden layers 922a, 922b, through 922n in order to provide the output through the output layer 924. In an example in which the neural network 900 is used to identify objects in images, the neural network 900 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 900 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 900 is trained well enough so that the weights of the layers are accurately tuned.

For the example of identifying objects in images, the forward pass can include passing a training image through the neural network 900. The weights are initially randomized before the neural network 900 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 900, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 900 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $$E_{total} = \sum \frac{1}{2}(\text{target} - \text{output})^2,$$

which calculates the sum of one-half times a ground truth output (e.g., the actual answer) minus the predicted output (e.g., the predicted answer) squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 900 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 900 can include any suitable deep network. One example includes a convolutional neural network (CNN), which includes an input layer and an output layer, with multiple hidden layers between the input and output layers. An example of a CNN is described below with respect to FIG. 10. The hidden layers of a CNN include a series of convolutional, nonlinear, pooling (for downsampling), and fully connected layers. The neural network 900 can include any other deep network other than a CNN, such as an autoencoder, a deep belief nets (DBNs), a Recurrent Neural Networks (RNNs), among others.

Figure 10:
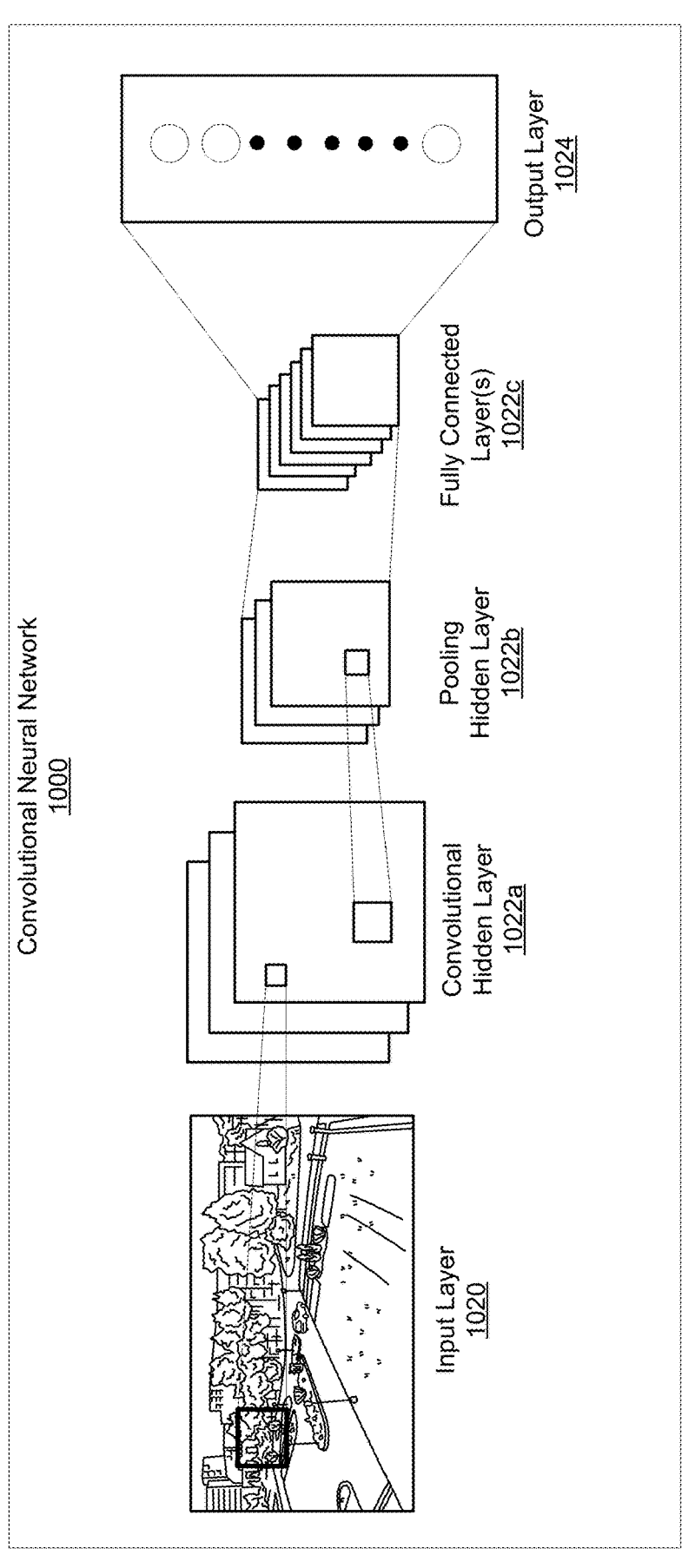
FIG. 10 is a block diagram illustrating an example of a convolutional neural network, in accordance with some examples.

FIG. 10 is an illustrative example of a convolutional neural network 1000 (CNN 1000). The input layer 1020 of the CNN 1000 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1022*a*, an optional non-linear activation layer, a pooling hidden layer 1022*b*, and fully connected hidden layers 1022*c* to get an output at the output layer 1024. While only one of each hidden layer is shown in FIG. 10, one of ordinary skill will appreciate that multiple convolutional hidden layers, non-linear layers, pooling hidden layers, and/or fully connected layers can be included in the CNN 1000. As previously described, the output can indicate a single class of an object or can include a probability of classes that best describe the object in the image.

The first layer of the CNN 1000 is the convolutional hidden layer 1022*a*. The convolutional hidden layer 1022*a* analyzes the image data of the input layer 1020. Each node of the convolutional hidden layer 1022*a* is connected to a region of nodes (pixels) of the input image called a receptive field. The convolutional hidden layer 1022*a* can be considered as one or more filters (each filter corresponding to a different activation or feature map), with each convolutional iteration of a filter being a node or neuron of the convolutional hidden layer 1022*a*. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1022*a*. Each connection between a node and a receptive field for that node learns a weight and, in some cases, an overall bias such that each node learns to analyze its particular local receptive field in the input image. Each node of the hidden layer 1022*a* will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 1022*a* is due to each node of the convolutional layer being applied to its corresponding receptive field. For example, a filter of the convolutional hidden layer 1022*a* can begin in the top-left corner of the input image array and can convolve around the input image. As noted above, each convolutional iteration of the filter can be considered a node or neuron of the convolutional hidden layer 1022a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1022a.

For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1022a.

The mapping from the input layer to the convolutional hidden layer 1022a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 1022a can include several activation maps in order to identify multiple features in an image. The example shown in FIG. 10 includes three activation maps. Using three activation maps, the convolutional hidden layer 1022a can detect three different kinds of features, with each feature being detectable across the entire image.

In some examples, a non-linear hidden layer can be applied after the convolutional hidden layer 1022a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 1000 without affecting the receptive fields of the convolutional hidden layer 1022a.

The pooling hidden layer 1022b can be applied after the convolutional hidden layer 1022a (and after the non-linear hidden layer when used). The pooling hidden layer 1022b is used to simplify the information in the output from the convolutional hidden layer 1022a. For example, the pooling hidden layer 1022b can take each activation map output from the convolutional hidden layer 1022a and generates a condensed activation map (or feature map) using a pooling function. Max-pooling is one example of a function performed by a pooling hidden layer. Other forms of pooling functions be used by the pooling hidden layer 1022a, such as average pooling, L2-norm pooling, or other suitable pooling functions. A pooling function (e.g., a max-pooling filter, an L2-norm filter, or other suitable pooling filter) is applied to each activation map included in the convolutional hidden layer 1022a. In the example shown in FIG. 10, three pooling filters are used for the three activation maps in the convolutional hidden layer 1022a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 1022a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1022a having a dimension of 24×24 nodes, the output from the pooling hidden layer 1022b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1000.

The final layer of connections in the network is a fully-connected layer that connects every node from the pooling hidden layer 1022b to every one of the output nodes in the output layer 1024. Using the example above, the input layer includes 28×28 nodes encoding the pixel intensities of the input image, the convolutional hidden layer 1022a includes 3×24×24 hidden feature nodes based on application of a 5×5 local receptive field (for the filters) to three activation maps, and the pooling layer 1022b includes a layer of 3×12×12 hidden feature nodes based on application of max-pooling filter to 2×2 regions across each of the three feature maps. Extending this example, the output layer 1024 can include ten output nodes. In such an example, every node of the 3×12×12 pooling hidden layer 1022b is connected to every node of the output layer 1024.

The fully connected layer 1022c can obtain the output of the previous pooling layer 1022b (which should represent the activation maps of high-level features) and determines the features that most correlate to a particular class. For example, the fully connected layer 1022c layer can determine the high-level features that most strongly correlate to a particular class, and can include weights (nodes) for the high-level features. A product can be computed between the weights of the fully connected layer 1022c and the pooling hidden layer 1022b to obtain probabilities for the different classes. For example, if the CNN 1000 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1024 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 110% probability that the image is the fourth class of object (e.g., a human), and a 15% probability that the image is the sixth class of object (e.g., a kangaroo). The probability for a class can be considered a confidence level that the object is part of that class.

In some aspects, training of one or more of the machine learning systems or neural networks described herein (e.g., such as the fully connected neural network 202 of FIG. 2A, the locally connected neural network 204 of FIG. 2B, the convolutional network 206 of FIG. 2C, the depth completion machine learning network 500 of FIG. 5A, the depth completion machine learning system 550 of FIG. 5B, the machine learning architecture 600 of FIG. 6, the machine learning architecture 700 of FIG. 7A, the 3D self-attention engine 740b of FIG. 7B among various other machine learning networks or components described herein) can be performed using online training (e.g., in some case on-device training), offline training, and/or various combinations of online and offline training. In some cases, online may refer to time periods during which the input data (e.g., such as the image and sparse depth information described with respect to FIGS. 5A-FIG. 7B, etc.) is processed, for instance for performance of the attention-based refinement for depth completion implemented by the systems and techniques described herein. In some examples, offline may refer to idle time periods or time periods during which input data is not being processed. Additionally, offline may be based on one or more time conditions (e.g., after a particular amount of time has expired, such as a day, a week, a month, etc.) and/or may be based on various other conditions such as network and/or server availability, etc., among various others. In some aspects, offline training of a machine learning model (e.g., a neural network model) can be performed by a first device (e.g., a server device) to generate a pre-trained model, and a second device can receive the trained model from the second device. In some cases, the second device (e.g., a mobile device, an XR device, a vehicle or system/component of the vehicle, or other device) can perform online (or on-device) training of the pre-trained model to further adapt or tune the parameters of the model.

Figure 11:
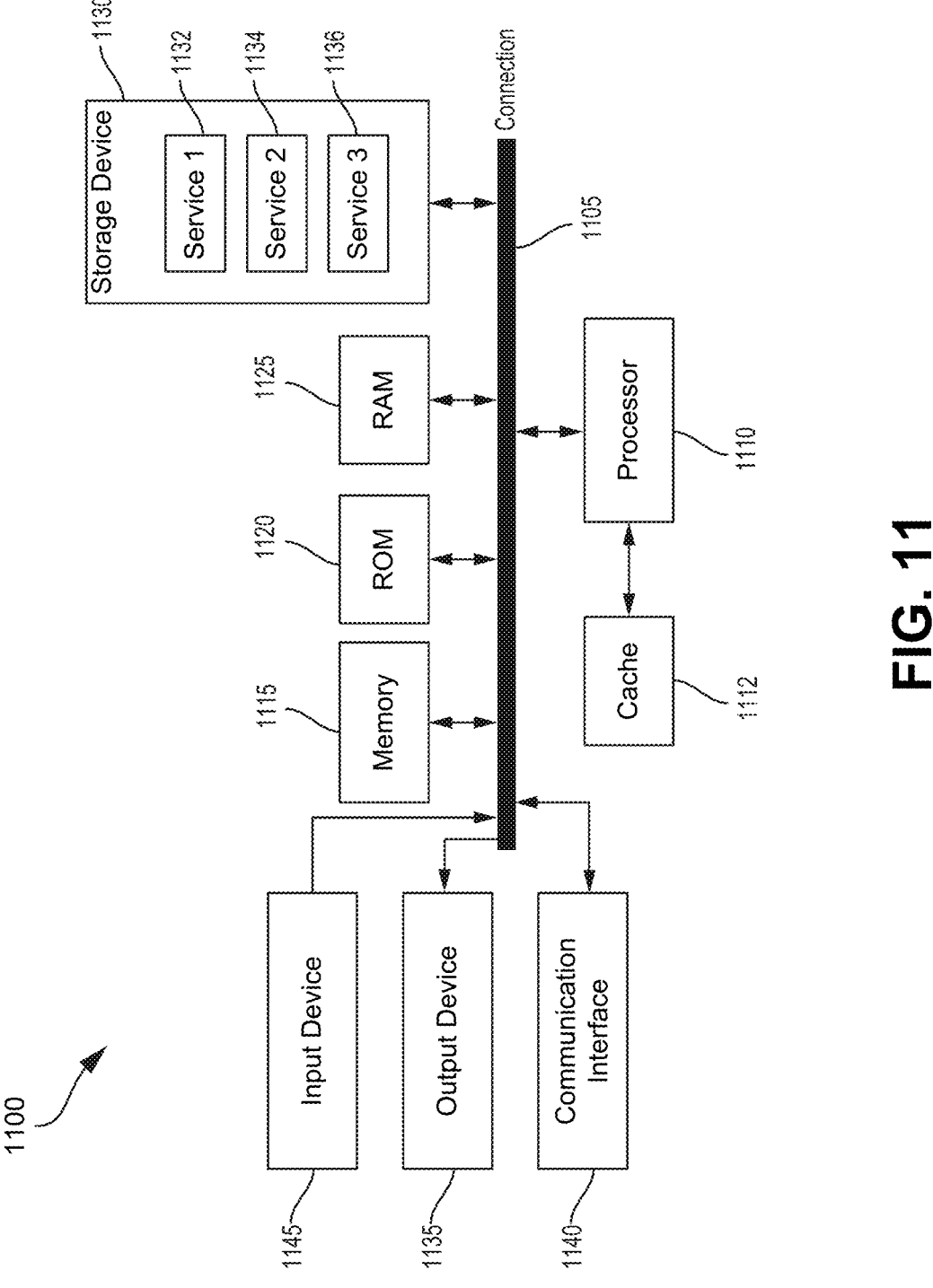
FIG. 11 is a block diagram illustrating an example of a computing system, which may be employed by the disclosed systems and techniques, in accordance with some examples.

FIG. 11 is a diagram illustrating an example of a system for implementing certain aspects of the present disclosure. In particular, FIG. 11 illustrates an example of computing system 1100, which can be for example any computing device making up a computing system, a camera system, or any component thereof in which the components of the system are in communication with each other using connection 1105. Connection 1105 can be a physical connection using a bus, or a direct connection into processor 1110, such as in a chipset architecture. Connection 1105 can also be a virtual connection, networked connection, or logical connection.

In some examples, computing system 1100 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example system 1100 includes at least one processing unit (CPU or processor) 1110 and connection 1105 that couples various system components including system memory 1115, such as read-only memory (ROM) 1120 and random access memory (RAM) 1125 to processor 1110. Computing system 1100 can include a cache 1112 of high-speed memory connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms. In some instances, multimodal systems can enable a user to provide multiple types of input/output to communicate with computing system 1100. Computing system 1100 can include communications interface 1140, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 1102.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1130 can include software services, servers, services, etc., that when the code that defines such software is executed by the processor 1110, it causes the system to perform a function. In some examples, a hardware service that performs a particular function can include the software component stored in a computer-readable medium in connection with the necessary hardware components, such as processor 1110, connection 1105, output device 1135, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random-access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. An apparatus configured to generate depth information from one or more images, the apparatus comprising: one or more memories configured to store the one or more images; and one or more processors coupled to the one or more memories, the one or more processors being configured to: obtain a first depth map corresponding to an input comprising an image of the one or more images and a sparse depth measurement; generate a three-dimensional (3D) point cloud based on the first depth map and multi-scale visual features of the input, wherein the 3D point cloud includes a plurality of 3D point features uplifted from the multi-scale visual features; process at least a portion of the plurality of 3D point features using one or more self-attention layers to generate refined 3D point features; generate a two-dimensional (2D) projection of the refined 3D point features; and generate a second depth map based on the 2D projection of the refined 3D point features.

Aspect 2. The apparatus of Aspect 1, wherein: the first depth map is an initial dense depth map estimate corresponding to the input; and the second depth map is a refined dense depth map estimate corresponding to the input and the initial dense depth map estimate.

Aspect 3. The apparatus of any of Aspects 1 to 2, wherein the multi-scale visual features of the input comprise a plurality of 2D features generated based on the input and associated with the first depth map.

Aspect 4. The apparatus of any of Aspects 1 to 3, wherein, to obtain the first depth map, the one or more processors are configured to: receive a dense depth map estimate generated based on the input by a depth completion machine learning network.

Aspect 5. The apparatus of any of Aspects 1 to 4, wherein, to obtain the first depth map, the one or more processors are configured to: receive the input comprising the image and the sparse depth measurement; extract, using an encoder of a depth completion machine learning network, the multi-scale visual features from the image; process the multi-scale visual features using one or more 2D self-attention sub-networks of the depth completion machine learning network to generate attended multi-scale visual features; and generate, using the depth completion machine learning network, the first depth map based on the attended multi-scale visual features.

Aspect 6. The apparatus of any of Aspects 1 to 5, wherein the refined 3D point features comprises attended 3D point features generated based on the plurality of 3D point features and using the one or more self-attention layers.

Aspect 7. The apparatus of any of Aspects 1 to 6, wherein, to generate the 3D point cloud, the one or more processors are configured to uplift the multi-scale visual features of the input to the plurality of 3D point features, wherein: the multi-scale visual features are 2D features associated with a 2D image plane corresponding to the image; and each respective 3D point feature of the plurality of 3D point features is associated with a corresponding 2D feature of the multi-scale visual features.

Aspect 8. The apparatus of Aspect 7, wherein the one or more processors are configured to uplift a respective multi-scale visual feature based on a corresponding pixel location associated with the respective multi-scale visual feature, wherein the corresponding pixel location is within the image.

Aspect 9. The apparatus of any of Aspects 7 to 8, wherein the one or more processors are configured to: downsample the 3D point cloud to generate a downsampled 3D point cloud, wherein the downsampled 3D point cloud includes a subset of the plurality of 3D point features.

Aspect 10. The apparatus of Aspect 9, wherein the subset of the plurality of 3D point features and the at least a portion of the plurality of 3D point features are the same.

Aspect 11. The apparatus of any of Aspects 9 to 10, wherein, to generate the refined 3D point features, the one or more processors are configured to: process each respective 3D point feature of the downsampled 3D point cloud using the one or more self-attention layers to generate attended downsampled 3D point features, wherein the attended downsampled 3D point features and the refined 3D point features are the same.

Aspect 12. The apparatus of Aspect 11, wherein, to generate the second depth map, the one or more processors are configured to: perform image-guided upsampling of a 2D projection of the attended downsampled 3D point features, wherein an upsampled 2D projection of the attended downsampled 3D point features and the multi-scale visual features of the input have a same spatial resolution; and generate the second depth map based on the upsampled 2D projection.

Aspect 13. The apparatus of Aspect 12, wherein, to perform the image-guided upsampling, the one or more processors are configured to: process, using one or more cross-attention layers, the multi-scale visual features of the input as an attention query (Q); and process, using the one or more cross-attention layers, the 2D projection of the attended downsampled 3D point features as an attention key (K) and an attention value (V).

Aspect 14. The apparatus of Aspect 13, wherein the multi-scale visual features of the input are extracted from the image by a decoder of a depth completion machine learning network.

Aspect 15. The apparatus of any of Aspects 13 to 14, wherein the multi-scale visual features of the input are extracted from the image by an encoder of a depth completion machine learning network.

Aspect 16. The apparatus of any of Aspects 12 to 15, wherein, to perform the image-guided upsampling, the one or more processors are configured to: process, using one or more cross-attention layers, upsampled 3D-to-2D projected features as an attention query (Q); and process, using the one or more cross-attention layers, one or more decoder features corresponding to the input as an attention key (K) and an attention value (V).

Aspect 17. The apparatus of any of Aspects 1 to 16, further comprising one or more cameras configured to capture the one or more images.

Aspect 18. A method for generating depth information from one or more images, the method comprising: obtaining a first depth map corresponding to an input comprising an image of the one or more images and a sparse depth measurement; generating a three-dimensional (3D) point cloud based on the first depth map and multi-scale visual features of the input, wherein the 3D point cloud includes a plurality of 3D point features uplifted from the multi-scale visual features; processing at least a portion of the plurality of 3D point features using one or more self-attention layers to generate refined 3D point features; generating a two-dimensional (2D) projection of the refined 3D point features; and generating a second depth map based on the 2D projection of the refined 3D point features.

Aspect 19. The method of Aspect 18, wherein: the first depth map is an initial dense depth map estimate corresponding to the input; and the second depth map is a refined dense depth map estimate corresponding to the input and the initial dense depth map estimate.

Aspect 20. The method of any of Aspects 18 to 19, wherein the multi-scale visual features of the input comprise a plurality of 2D features generated based on the input and associated with the first depth map.

Aspect 21. The method of any of Aspects 18 to 20, wherein obtaining the first depth map comprises: receiving a dense depth map estimate generated based on the input by a depth completion machine learning network.

Aspect 22. The method of any of Aspects 18 to 21, wherein obtaining the first depth map comprises: receiving the input comprising the image and the sparse depth measurement; extracting, using an encoder of a depth completion machine learning network, the multi-scale visual features from the image; processing the multi-scale visual features using one or more 2D self-attention sub-networks of the depth completion machine learning network to generate attended multi-scale visual features; and generating, using the depth completion machine learning network, the first depth map based on the attended multi-scale visual features.

Aspect 23. The method of any of Aspects 18 to 22, wherein the refined 3D point features comprises attended 3D point features generated based on the plurality of 3D point features and using the one or more self-attention layers.

Aspect 24. The method of any of Aspects 18 to 23, wherein generating the 3D point cloud is based on uplifting the multi-scale visual features of the input to the plurality of 3D point features, wherein: the multi-scale visual features are 2D features associated with a 2D image plane corresponding to the image; and each respective 3D point feature of the plurality of 3D point features is associated with a corresponding 2D feature of the multi-scale visual features.

Aspect 25. The method of Aspect 24, further comprising uplifting a respective multi-scale visual feature based on a corresponding pixel location associated with the respective multi-scale visual feature, wherein the corresponding pixel location is within the image.

Aspect 26. The method of any of Aspects 24 to 25, further comprising: downsampling the 3D point cloud to generate a downsampled 3D point cloud, wherein the downsampled 3D point cloud includes a subset of the plurality of 3D point features.

Aspect 27. The method of Aspect 26, wherein the subset of the plurality of 3D point features and the at least a portion of the plurality of 3D point features are the same.

Aspect 28. The method of any of Aspects 26 to 27, wherein generating the refined 3D point features comprises: processing each respective 3D point feature of the downsampled 3D point cloud using the one or more self-attention layers to generate attended downsampled 3D point features, wherein the attended downsampled 3D point features and the refined 3D point features are the same.

Aspect 29. The method of Aspect 28, wherein generating the second depth map comprises: performing image-guided upsampling of a 2D projection of the attended downsampled 3D point features, wherein an upsampled 2D projection of the attended downsampled 3D point features and the multi-scale visual features of the input have a same spatial resolution; and generating the second depth map based on the upsampled 2D projection.

Aspect 30. The method of Aspect 29, wherein performing the image-guided upsampling comprises: processing, using one or more cross-attention layers, the multi-scale visual features of the input as an attention query (Q); and processing, using the one or more cross-attention layers, the 2D projection of the attended downsampled 3D point features as an attention key (K) and an attention value (V).

Aspect 31. The method of Aspect 30, wherein the multi-scale visual features of the input are extracted from the image by a decoder of a depth completion machine learning network.

Aspect 32. The method of any of Aspects 30 to 31, wherein the multi-scale visual features of the input are extracted from the image by an encoder of a depth completion machine learning network.

Aspect 33. The method of any of Aspects 29 to 32, wherein performing the image-guided upsampling comprises: processing, using one or more cross-attention layers, upsampled 3D-to-2D projected features as an attention query (Q); and processing, using the one or more cross-attention layers, one or more decoder features corresponding to the input as an attention key (K) and an attention value (V).

Aspect 34. A non-transitory computer-readable storage medium comprising instructions stored thereon which, when executed by at least one processor, causes the at least one processor to perform operations according to any of Aspects 1 to 17.

Aspect 35. A non-transitory computer-readable storage medium comprising instructions stored thereon which, when executed by at least one processor, causes the at least one processor to perform operations according to any of Aspects 18 to 33.

Aspect 36. An apparatus for wireless communication comprising one or more means for performing operations according to any of Aspects 1 to 17.

Aspect 37. An apparatus for wireless communication comprising one or more means for performing operations according to any of Aspects 18 to 33.

What is claimed is:

1. An apparatus configured to generate depth information from one or more images, the apparatus comprising:
one or more memories configured to store the one or more images; and
one or more processors coupled to the one or more memories, the one or more processors being configured to:
obtain a first depth map corresponding to an input comprising an image of the one or more images and a sparse depth measurement;
generate a three-dimensional (3D) point cloud based on the first depth map and multi-scale visual features of the input, wherein the 3D point cloud includes a plurality of 3D point features uplifted from the multi-scale visual features;
process at least a portion of the plurality of 3D point features using one or more self-attention layers to generate refined 3D point features;
generate a two-dimensional (2D) projection of the refined 3D point features; and
generate a second depth map based on the 2D projection of the refined 3D point features.

2. The apparatus of claim 1, wherein:
the first depth map is an initial dense depth map estimate corresponding to the input; and
the second depth map is a refined dense depth map estimate corresponding to the input and the initial dense depth map estimate.

3. The apparatus of claim 1, wherein the multi-scale visual features of the input comprise a plurality of 2D features generated based on the input and associated with the first depth map.

4. The apparatus of claim 1, wherein, to obtain the first depth map, the one or more processors are configured to:
receive a dense depth map estimate generated based on the input by a depth completion machine learning network.

5. The apparatus of claim 1, wherein, to obtain the first depth map, the one or more processors are configured to:
receive the input comprising the image and the sparse depth measurement;
extract, using an encoder of a depth completion machine learning network, the multi-scale visual features from the image;
process the multi-scale visual features using one or more 2D self-attention sub-networks of the depth completion machine learning network to generate attended multi-scale visual features; and
generate, using the depth completion machine learning network, the first depth map based on the attended multi-scale visual features.

6. The apparatus of claim 1, wherein the refined 3D point features comprises attended 3D point features generated based on the plurality of 3D point features and using the one or more self-attention layers.

7. The apparatus of claim 1, wherein, to generate the 3D point cloud, the one or more processors are configured to uplift the multi-scale visual features of the input to the plurality of 3D point features, wherein:
the multi-scale visual features are 2D features associated with a 2D image plane corresponding to the image; and
each respective 3D point feature of the plurality of 3D point features is associated with a corresponding 2D feature of the multi-scale visual features.

8. The apparatus of claim 7, wherein the one or more processors are configured to uplift a respective multi-scale visual feature based on a corresponding pixel location associated with the respective multi-scale visual feature, wherein the corresponding pixel location is within the image.

9. The apparatus of claim 7, wherein the one or more processors are configured to:
downsample the 3D point cloud to generate a downsampled 3D point cloud, wherein the downsampled 3D point cloud includes a subset of the plurality of 3D point features.

10. The apparatus of claim 9, wherein the subset of the plurality of 3D point features and the at least a portion of the plurality of 3D point features are the same.

11. The apparatus of claim 9, wherein, to generate the refined 3D point features, the one or more processors are configured to:
process each respective 3D point feature of the downsampled 3D point cloud using the one or more self-attention layers to generate attended downsampled 3D point features, wherein the attended downsampled 3D point features and the refined 3D point features are the same.

12. The apparatus of claim 11, wherein, to generate the second depth map, the one or more processors are configured to:

perform image-guided upsampling of a 2D projection of the attended downsampled 3D point features, wherein an upsampled 2D projection of the attended downsampled 3D point features and the multi-scale visual features of the input have a same spatial resolution; and generate the second depth map based on the upsampled 2D projection.

13. The apparatus of claim 12, wherein, to perform the image-guided upsampling, the one or more processors are configured to:

process, using one or more cross-attention layers, the multi-scale visual features of the input as an attention query (Q); and process, using the one or more cross-attention layers, the 2D projection of the attended downsampled 3D point features as an attention key (K) and an attention value (V).

14. The apparatus of claim 13, wherein the multi-scale visual features of the input are extracted from the image by a decoder of a depth completion machine learning network.

15. The apparatus of claim 13, wherein the multi-scale visual features of the input are extracted from the image by an encoder of a depth completion machine learning network.

16. The apparatus of claim 12, wherein, to perform the image-guided upsampling, the one or more processors are configured to:

process, using one or more cross-attention layers, upsampled 3D-to-2D projected features as an attention query (Q); and process, using the one or more cross-attention layers, one or more decoder features corresponding to the input as an attention key (K) and an attention value (V).

17. The apparatus of claim 1, further comprising one or more cameras configured to capture the one or more images.

18. A method for generating depth information from one or more images, the method comprising:

obtaining a first depth map corresponding to an input comprising an image of the one or more images and a sparse depth measurement;

generating a three-dimensional (3D) point cloud based on the first depth map and multi-scale visual features of the input, wherein the 3D point cloud includes a plurality of 3D point features uplifted from the multi-scale visual features;

processing at least a portion of the plurality of 3D point features using one or more self-attention layers to generate refined 3D point features;

generating a two-dimensional (2D) projection of the refined 3D point features; and generating a second depth map based on the 2D projection of the refined 3D point features.

19. The method of claim 18, wherein:

the first depth map is an initial dense depth map estimate corresponding to the input; and the second depth map is a refined dense depth map estimate corresponding to the input and the initial dense depth map estimate.

20. The method of claim 18, wherein the multi-scale visual features of the input comprise a plurality of 2D features generated based on the input and associated with the first depth map.

* * * * *